(12) United States Patent
Kataoka et al.

(10) Patent No.: US 11,948,711 B2
(45) Date of Patent: Apr. 2, 2024

(54) GRAIN ORIENTED ELECTRICAL STEEL SHEET

(71) Applicant: NIPPON STEEL CORPORATION, Tokyo (JP)

(72) Inventors: Takashi Kataoka, Tokyo (JP); Ichiro Tanaka, Tokyo (JP); Haruhiko Atsumi, Tokyo (JP); Kazutoshi Takeda, Tokyo (JP); Ryutaro Yamagata, Tokyo (JP); Nobusato Morishige, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 202 days.

(21) Appl. No.: 17/761,092

(22) PCT Filed: Sep. 16, 2020

(86) PCT No.: PCT/JP2020/035119
§ 371 (c)(1),
(2) Date: Mar. 16, 2022

(87) PCT Pub. No.: WO2021/054371
PCT Pub. Date: Mar. 25, 2021

(65) Prior Publication Data
US 2022/0344084 A1 Oct. 27, 2022

(30) Foreign Application Priority Data

Sep. 19, 2019 (JP) .................. 2019-170881

(51) Int. Cl.
*C22C 38/00* (2006.01)
*C21D 3/04* (2006.01)
(Continued)

(52) U.S. Cl.
CPC .......... *H01F 1/14783* (2013.01); *C21D 3/04* (2013.01); *C21D 6/002* (2013.01); *C21D 6/005* (2013.01);
(Continued)

(58) Field of Classification Search
CPC ... C22C 38/001; C22C 38/002; C22C 38/008; C22C 38/04; C22C 38/06; C22C 38/20; C22C 38/28; C22C 38/34
(Continued)

(56) References Cited

U.S. PATENT DOCUMENTS

| | | |
|---|---|---|
| 5,565,272 A | 10/1996 | Masui et al. |
| 2009/0047537 A1 | 2/2009 | Nanba et al. |
| 2018/0066334 A1 | 3/2018 | Mogi et al. |

FOREIGN PATENT DOCUMENTS

| | | |
|---|---|---|
| EP | 0 926 250 A1 | 6/1999 |
| EP | 2 096 185 A1 | 9/2009 |

(Continued)

*Primary Examiner* — Katherine A Christy
(74) *Attorney, Agent, or Firm* — Birch, Stewart, Kolasch & Birch, LLP

(57) ABSTRACT

A grain oriented electrical steel sheet includes a base steel sheet, a glass film, and a tension-insulation coating. When a glow discharge emission spectroscopy is conducted from a surface of the glass film toward a depth direction, an analysis starting time Ts, a time $T^{Al}_p$ at which Al shows a maximum emission intensity, an Al emission intensity $F(T^{Al}_p)$ at the $T^{Al}_p$, a time $T^{Si}_p$ at which Si shows a maximum emission intensity, and an Al emission intensity $F(T^{Si}_p)$ at the $T^{Si}_p$ satisfy $0.05 \leq F(T^{Si}_p)/F(T^{Al}_p) \leq 0.50$ and $2.0 \leq (T^{Al}_p - Ts)/(T^{Si}_p - Ts) \leq 5.0$.

8 Claims, 4 Drawing Sheets

(51) Int. Cl.
*C21D 6/00* (2006.01)
*C21D 8/00* (2006.01)
*C21D 8/12* (2006.01)
*C21D 9/46* (2006.01)
*C22C 38/04* (2006.01)
*C22C 38/06* (2006.01)
*C22C 38/20* (2006.01)
*C22C 38/28* (2006.01)
*C22C 38/34* (2006.01)
*H01F 1/147* (2006.01)

(52) U.S. Cl.
CPC .............. *C21D 6/008* (2013.01); *C21D 8/005* (2013.01); *C21D 8/1233* (2013.01); *C21D 8/1283* (2013.01); *C21D 9/46* (2013.01); *C22C 38/001* (2013.01); *C22C 38/002* (2013.01); *C22C 38/008* (2013.01); *C22C 38/04* (2013.01); *C22C 38/06* (2013.01); *C22C 38/20* (2013.01); *C22C 38/28* (2013.01); *C22C 38/34* (2013.01)

(58) Field of Classification Search
USPC .......................................................... 428/677
See application file for complete search history.

(56) References Cited

FOREIGN PATENT DOCUMENTS

| | | |
|---|---|---|
| JP | 6-17261 A | 1/1994 |
| JP | 11-61356 A | 3/1999 |
| JP | 2000-204450 A | 7/2000 |
| JP | 2012-214902 A | 11/2012 |
| JP | 2018-53346 A | 4/2018 |

GRAIN ORIENTED ELECTRICAL STEEL SHEET

TECHNICAL FIELD

The present invention relates to a grain oriented electrical steel sheet.

Priorities are claimed on Japanese Patent Applications: No. 2019-170881, filed on Sep. 19, 2019, and the content of which is incorporated herein by reference.

BACKGROUND ART

A grain oriented electrical steel sheet includes 0.5 to 7 mass % of Si, and the crystal orientation thereof is controlled to be aligned with {110}<001> (Goss orientation). The grain oriented electrical steel sheet is used as soft magnetic material for iron core material of a transformer and other electric equipment.

In general, the grain oriented electrical steel sheet includes a base steel sheet, a glass film, and a tension-insulation coating. The glass film is formed on the base steel sheet, and the tension-insulation coating is formed on the glass film. By arranging the tension-insulation coating and the glass film, the insulation between the steel sheets is increased, and thus, the magnetic efficiency is improved.

The glass film is the oxide which mainly includes forsterite ($Mg_2SiO_4$) and contributes to an increase in tension and insulation. The glass film also contributes to an increase in adhesion of the tension-insulation coating to the base steel sheet. Accordingly, it is required to improve adhesion of the glass film to the base steel sheet.

The techniques to improve the adhesion of the glass film to the base steel sheet are disclosed in Japanese Unexamined Patent Application, First Publication No. 2012-214902 (patent document 1), Japanese Unexamined Patent Application, First Publication No. 2018-53346 (patent document 2), and Japanese Unexamined Patent Application, First Publication No. H11-61356 (patent document 3).

In the grain oriented electrical steel sheet disclosed in the patent document 1 which includes 1.8 to 7 mass % of Si and which has a primary coating mainly including the forsterite on surface thereof, at least one of Ce, La, Pr, Nd, Sc, and Y is included in the primary coating and the coating weight thereof is 0.001 to 1000 mg/m² per side.

In the grain oriented electrical steel sheet disclosed in the patent document 2, an area fraction of voids is 20% or less in the cross section of the glass film formed between the insulating coating and the base steel sheet.

In the grain oriented electrical steel sheet disclosed in the patent document 3, Si peak intensity obtained by conducting a glow discharge emission spectroscopy from an oxide film surface is ½ or more of Al peak intensity, and depth from the oxide film surface to Si peak position is 1/10 or less of depth from the oxide film surface to Al peak position.

RELATED ART DOCUMENTS

Patent Documents

[Patent Document 1] Japanese Unexamined Patent Application, First Publication No. 2012-214902
[Patent Document 2] Japanese Unexamined Patent Application, First Publication No. 2018-53346
[Patent Document 3] Japanese Unexamined Patent Application, First Publication No. H11-61356

SUMMARY OF INVENTION

Technical Problem to be Solved

Although the adhesion of the glass film increases in the patent documents 1 to 3, the adhesion of the glass film may be improved by other features.

The present invention has been made in consideration of the above mentioned situations. An object of the invention is to provide the grain oriented electrical steel sheet excellent in the adhesion of the glass film.

Solution to Problem

An aspect of the present invention employs the following.
(1) A grain oriented electrical steel sheet according to an aspect of the present invention includes:
  a base steel sheet;
  a glass film which is arranged on the base steel sheet; and
  a tension-insulation coating which is arranged on the glass film, wherein an average chemical composition of the base steel sheet and the glass film includes by mass %:
  0.010% or less of C;
  2.5 to 4.0% of Si;
  0.01 to 1.00% of Mn;
  0.010% or less of N;
  0.010% or less of sol Al;
  0.005 to 0.030% of insol Al;
  0.05 to 0.20% of Mg;
  0.05 to 0.40% of O;
  0 to 0.020% of Ti;
  0.010% or less of S;
  0.030% or less of P;
  0 to 0.50% of Sn;
  0 to 0.50% of Cr;
  0 to 0.50% of Cu;
  0 to 0.0100% of Bi;
  0 to 0.020% of Se;
  0 to 0.50% of Sb; and
  a balance consisting of Fe and impurities, and
  wherein, when glow emission spectroscopic spectrums of Al and Si are measured by conducting a glow discharge emission spectroscopy from a surface of the glass film toward a depth direction,
  when Ts which is an analysis starting time is regarded as the surface of the glass film,
  when $T^{Al}_p$ is regarded as a time at which Al shows a maximum emission intensity,
  when $F(T^{Al}_p)$ is regarded as an Al emission intensity at the $T^{Al}_p$,
  when $T^{Si}_p$ is regarded as a time at which Si shows a maximum emission intensity, and
  when $F(T^{Si}_p)$ is regarded as an Al emission intensity at the $T^{Si}_p$,
  the Ts, the $T^{Al}_p$, the $F(T^{Al}_p)$, the $T^{Si}_p$, and the $F(T^{Si}_p)$ satisfy
  $0.05 \leq F(T^{Si}_p)/F(T^{Al}_p) \leq 0.50$ and
  $2.0 \leq (T^{Al}_p - Ts)/(T^{Si}_p - Ts) \leq 5.0$.
(2) In the grain oriented electrical steel sheet according to (1), a thickness of the base steel sheet may be 0.17 mm or more and less than 0.22 mm.
(3) In the grain oriented electrical steel sheet according to (1) or (2),
  the average chemical composition may include, by mass %, at least one selected from:
  0.01 to 0.50% of Cr;
  0.01 to 0.50% of Sn;

0.01 to 0.50% of Cu;
0.0010 to 0.0100% of Bi;
0.001 to 0.020% of Se; and
0.01 to 0.50% of Sb.

(4) In the grain oriented electrical steel sheet according to any one of (1) to (3), when glow emission spectroscopic spectrums of Al and Fe are measured by conducting a glow discharge emission spectroscopy from a surface of the glass film toward a depth direction, when $T^{Al}_p$ is regarded as a time at which Al shows a maximum emission intensity, when $T^{Fe}_{60}$ is regarded as a time at which an Fe emission intensity becomes 60% as compared with a saturation value of Fe emission intensity, and when $T^{Fe}_{90}$ is regarded as a time at which an Fe emission intensity becomes 90% as compared with the saturation value of Fe emission intensity, the $T^{Al}_p$, the $T^{Fe}_{60}$, and the $T^{Fe}_{90}$ may satisfy $T^{Fe}_{60} \leq T^{Al}_p \leq T^{Fe}_{90}$.

Effects of Invention

According to the above aspects of the present invention, it is possible to provide the grain oriented electrical steel sheet excellent in the adhesion of the glass film.

DETAILED DESCRIPTION OF PREFERRED EMBODIMENTS

Figure 1:
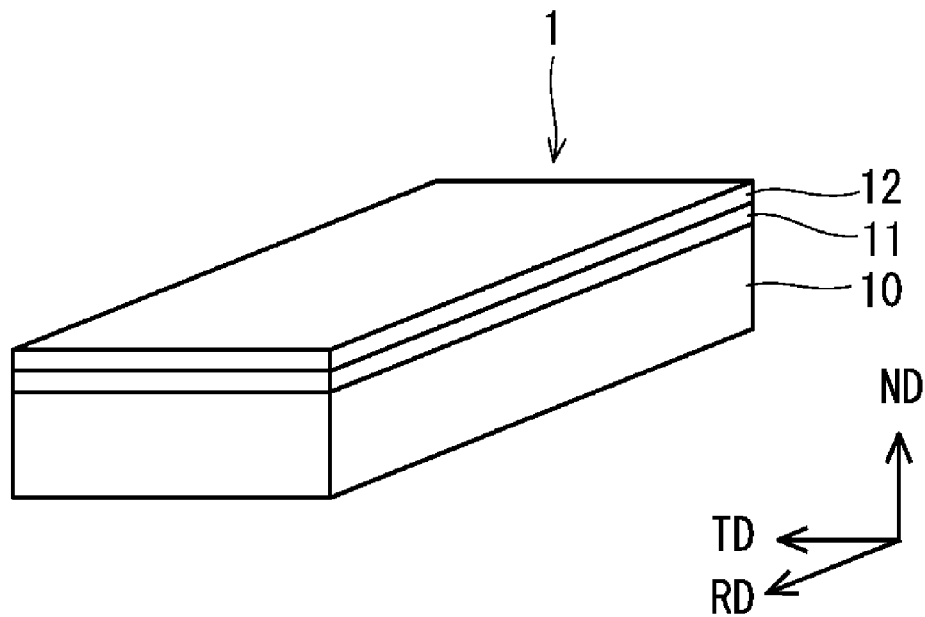
FIG. 1 is a perspective illustration showing a grain oriented electrical steel sheet according to an embodiment of the present invention.

Hereinafter, a preferred embodiment of the present invention is described in detail. However, the present invention is not limited only to the configuration which is disclosed in the present embodiment, and various modifications are possible without departing from the aspect of the present invention. In addition, the limitation range as described below includes a lower limit and an upper limit thereof. However, the value represented by "more than" "less than" does not include in the limitation range. Unless otherwise noted, "%" of the chemical composition represents "mass %".

The present inventors have made the investigation to improve the adhesion of the glass film for the grain oriented electrical steel sheet in which the chemical composition of the base steel sheet (average chemical composition of the base steel sheet and the glass film) includes by mass %:

0.010% or less of C;
2.5 to 4.0% of Si;
0.01 to 1.00% of Mn;
0.010% or less of N;
0.010% or less of sol Al;
0.005 to 0.030% of insol Al;
0.05 to 0.20% of Mg;
0.05 to 0.40% of 0;
0 to 0.020% of Ti;
0.010% or less of S;
0.030% or less of P;
0 to 0.50% of Sn;
0 to 0.50% of Cr;
0 to 0.50% of Cu;
0 to 0.0100% of Bi;
0 to 0.020% of Se;
0 to 0.50% of Sb; and
a balance consisting of Fe and impurities.

As explained above, even in conventional techniques, the adhesion of the glass film of the grain oriented electrical steel sheet has been a problem to be solved. In conventional techniques, for instance, the following approach has been taken in order to improve the adhesion of the glass film.

(A) The adhesion of the glass film is made to increase by adjusting an annealing separator.

(B) The adhesion of the glass film is made to increase by controlling the morphology of $SiO_2$ formed on the surface of the base steel sheet before final annealing. Specifically, the adhesion of the glass film is made to increase by controlling the morphology of $SiO_2$ with adjusting conditions in decarburization annealing process.

On the other hand, the present inventors have made the investigation to improve the adhesion of the glass film by a quite different approach compared with the conventional techniques. As a result of the investigation, it is found that the adhesion of the glass film is improved by localizing the spinel ($MgAl_2O_4$) near the interface with the base steel sheet in the glass film. The knowledge such that the adhesion of the glass film is improved by localizing the spinel near the interface is discovered for the first time by the present inventors.

It is possible to confirm the localization of the spinel to the interface in the glass film by the following method using a glow discharge emission spectroscopy. Specifically, the tension-insulation coating is removed, the glow discharge emission spectroscopy is conducted from a surface of the glass film toward a depth direction, and then, the glow emission spectroscopic spectrums showing Al emission intensity and Si emission intensity (GDS spectrum of Al and GDS spectrum of Si) are obtained. Ts which is an analysis starting time is defined as the surface of the glass film, $T^{Al}_p$ is defined as a time at which Al shows a maximum emission intensity in the GDS spectrum of Al, $F(T^{Al}_p)$ is defined as an Al emission intensity at the $T^{Al}_p$, $T^{Si}_p$ is defined as a time at which Si shows a maximum emission intensity in the GDS spectrum of Si, and $F(T^{Si}_p)$ is defined as an Al emission intensity at the $T^{Si}_p$ (specifically, $F(T^{Si}_p)$ is defined as the Al emission intensity at the peak position of the Si emission intensity). When the following expression (1) and the following expression (2) are satisfied, it is possible to judge that the spinel is sufficiently localized near the interface with the base steel sheet in the glass film.

$$0.05 \leq F(T^{Si}_p)/F(T^{Al}_p) \leq 0.50 \qquad \text{(expression 1)}$$

$$2.0 \leq (T^{Al}_p - Ts)/(T^{Si}_p - Ts) \leq 5.0 \qquad \text{(expression 2)}$$

In the grain oriented electrical steel sheet, the reason why the adhesion of the glass film is improved by localizing the spinel near the interface, specifically by satisfying the expression (1) and the expression (2), is not clear at present. However, the following reason is assumed. The fine unevenness is formed on the surface of the base steel sheet. When the spinel is localized near the interface with the base steel sheet in the glass film, the spinel is intruded into the concavity of surface unevenness of the base steel sheet. Thus, it seems that the spinel acts as the anchor and the adhesion of the glass film to the base steel sheet is improved. A mechanism different from the above mechanism may increase the adhesion of the glass film to the base steel sheet. However, from the examples explained below, it is confirmed that, when the expression (1) and the expression (2) are satisfied, the adhesion of the glass film to the base steel sheet is increased.

The grain oriented electrical steel sheet according to the embodiment, which is accomplished on the basis of the above findings has the following features.

The grain oriented electrical steel sheet according to the embodiment includes:
 a base steel sheet;
 a glass film which is arranged on the base steel sheet; and
 a tension-insulation coating which is arranged on the glass film,
 wherein an average chemical composition of the base steel sheet and the glass
  film includes by mass %:
   0.010% or less of C;
   2.5 to 4.0% of Si;
   0.01 to 1.00% of Mn;
   0.010% or less of N;
   0.010% or less of sol Al;
   0.005 to 0.030% of insol Al;
   0.05 to 0.20% of Mg;
   0.05 to 0.40% of O;
   0 to 0.020% of Ti;
   0.010% or less of S;
   0.030% or less of P;
   0 to 0.50% of Sn;
   0 to 0.50% of Cr;
   0 to 0.50% of Cu;
   0 to 0.0100% of Bi;
   0 to 0.020% of Se;
   0 to 0.50% of Sb; and
   a balance consisting of Fe and impurities, and
 wherein, when glow emission spectroscopic spectrums of Al and Si are measured by conducting a glow discharge emission spectroscopy from a surface of the glass film toward a depth direction,
  when Ts which is an analysis starting time is regarded as the surface of the glass film,
  when $T^{Al}_p$ is regarded as a time at which Al shows a maximum emission intensity,
  when $F(T^{Al}_p)$ is regarded as an Al emission intensity at the $T^{Al}_p$,
  when $T^{Si}_p$ is regarded as a time at which Si shows a maximum emission intensity, and
  when $F(T^{Si}_p)$ is regarded as an Al emission intensity at the $T^{Si}_p$,
  the Ts, the $T^{Al}_p$, the $F(T^{Al}_p)$, the $T^{Si}_p$, and the $F(T^{Si})$ satisfy
   $0.05 \leq F(T^{Si}_p)/F(T^{Al}_p) \leq 0.50$ and
   $2.0 \leq (T^{Al}_p - Ts)/(T^{Si}_p - Ts) \leq 5.0$.

In the glass film of the above grain oriented electrical steel sheet, the spinel is sufficiently localized near the interface between the glass film and the base steel sheet. Thus, the adhesion of the glass film is improved.

Moreover, in the grain oriented electrical steel sheet, a thickness of the base steel sheet may be 0.17 mm or more and less than 0.22 mm.

Moreover, in the grain oriented electrical steel sheet, the average chemical composition may include, by mass %, at least one element selected from:
 0.01 to 0.50% of Cr;
 0.01 to 0.50% of Sn;
 0.01 to 0.50% of Cu;
 0.0010 to 0.0100% of Bi;
 0.001 to 0.020% of Se; and
 0.01 to 0.50% of Sb.

Moreover, in the grain oriented electrical steel sheet,
 when glow emission spectroscopic spectrums of Al and Fe are measured by conducting a glow discharge emission spectroscopy from a surface of the glass film toward a depth direction,
  when $T^{Al}_p$ is regarded as a time at which Al shows a maximum emission intensity,
  when $T^{Fe}_{60}$ is regarded as a time at which an Fe emission intensity becomes 60% as compared with a saturation value of Fe emission intensity, and
  when $T^{Fe}_{90}$ is regarded as a time at which an Fe emission intensity becomes 90% as compared with the saturation value of Fe emission intensity,
  the $T^{Al}_p$, the $T^{Fe}_{60}$, and the $T^{Fe}_{90}$ may satisfy
   $T^{Fe}_{60} \leq T^{Al}_p \leq T^{Fe}_{90}$.

Hereinafter, the grain oriented electrical steel sheet according to the embodiment is described in detail.

(Structure of Grain Oriented Electrical Steel Sheet)

FIG. 1 is a perspective illustration showing the grain oriented electrical steel sheet according to the embodiment. As shown in FIG. 1, the grain oriented electrical steel sheet 1 according to the embodiment includes: a base steel sheet 10; and a glass film 11; and a tension-insulation coating 12. The glass film 11 is arranged on the base steel sheet 10. In FIG. 1, the glass film 11 is arranged on the surface of the base steel sheet 10 and in direct contact with the surface of the base steel sheet 10. The tension-insulation coating 12 is arranged on the glass film 11. In FIG. 1, the tension-insulation coating 12 is arranged on the surface of the glass film 11 and in direct contact with the surface of the glass film 11.

Figure 2:
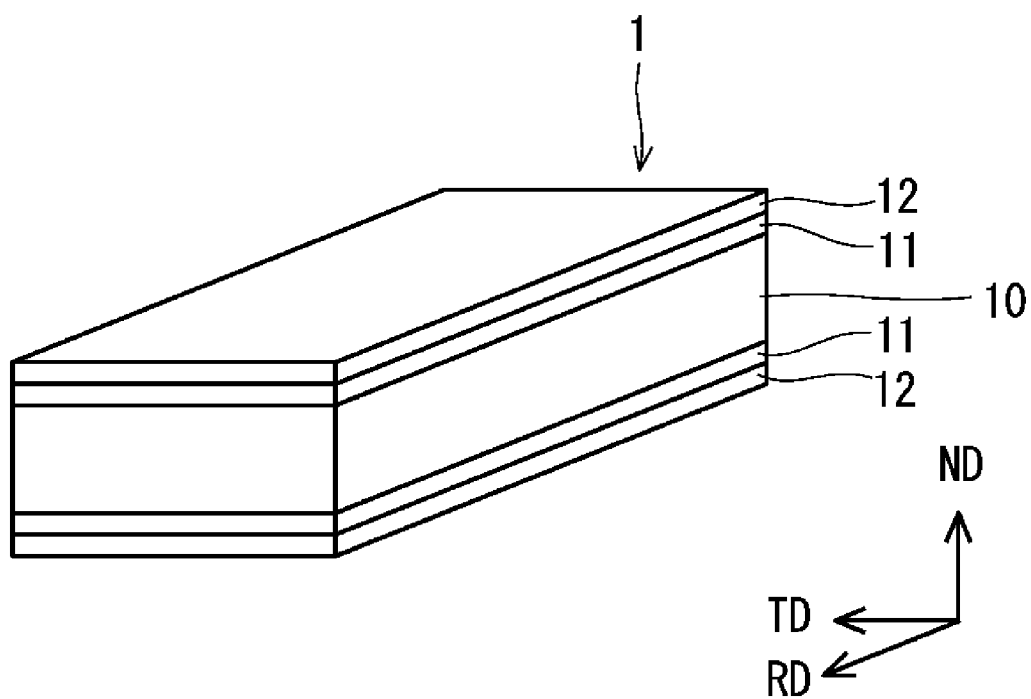
FIG. 2 is a perspective illustration showing a modification of the grain oriented electrical steel sheet according to the embodiment.

In FIG. 1, the tension-insulation coating 12 and the glass film 11 are formed only on one surface of the base steel sheet 10. However, as shown in FIG. 2, the tension-insulation coating 12 and the glass film 11 may be formed on both side surfaces of the base steel sheet 10.

(Average Chemical Composition of Base Steel Sheet 10 and Glass Film 11)

The chemical composition of the base steel sheet 10 with the glass film 11 after removing the tension-insulation coating 12 (average chemical composition of the base steel sheet 10 and the glass film 11) is obtained by known analysis method for composition. For instance, the analysis method for composition is as follows.

Firstly, the tension-insulation coating 12 is removed from the grain oriented electrical steel sheet 1. Specifically, the grain oriented electrical steel sheet 1 is immersed in sodium hydroxide aqueous solution which includes 30 to 50 mass % of NaOH and 50 to 70 mass % of $H_2O$ at 80 to 90° C. for 7 to 10 minutes. The steel sheet after immersing (the base steel sheet 10 with the glass film 11 after removing the tension-insulation coating 12) is water-washed. The steel sheet after water-washing is dried by a warm air blower for approximately less than 1 minute. By the above treatment, the tension-insulation coating 12 is removed, and the base steel sheet 10 with the glass film 11 is obtained.

The known analysis method for composition is conducted for the base steel sheet 10 with the glass film 11 after removing the tension-insulation coating 12. Specifically, the base steel sheet 10 with the glass film 11 is chipped using a drill, and the machined chips are taken. The above machined chips are dissolved in acid, and the solution is prepared. Using the solution, the elemental analysis of the chemical composition is conducted by ICP-AES (Inductively Coupled Plasma-Atomic Emission Spectrometer: inductively coupled plasma emission spectroscopy spectrometry).

Si in the chemical composition of the base steel sheet 10 with the glass film 11 is analyzed by the method (silicon quantification method) specified in JIS G1212 (1997). Specifically, when the above machined chips are dissolved in the acid, silicon oxide precipitates as a precipitate. The precipitate (silicon oxide) is filtered out with a filter paper, and the mass is measured to determine the Si content.

The C content and the S content are analyzed by known high frequency combustion method (infrared absorption method after combustion). Specifically, the above solution is combusted by high frequency induction heating in an oxygen stream, and the generated carbon dioxide and sulfur dioxide are detected to determine the C content and the S content.

The N content is analyzed by known thermal conductometric method after fusion in a current of inert gas. The O content is analyzed by known non-dispersive infrared absorption method after fusion in a current of inert gas.

By the above analysis methods, it is possible to obtain the chemical composition of the base steel sheet 10 with the glass film 11 (average chemical composition of the base steel sheet 10 and the glass film 11).

The grain oriented electrical steel sheet according to the embodiment includes, as the average chemical composition, base elements, optional elements as necessary, and a balance consisting of Fe and impurities. Hereinafter, unless otherwise noted, "%" of the element represents "mass %".

0.010% or Less of C

Carbon (C) is the optional element. C is an essential element for slab in order to improve the magnetic flux density. However, C is removed from the steel sheet in the production processes of the grain oriented electrical steel sheet. When more than 0.010% of C is remained as the average chemical composition, C forms cementite ($Fe_3C$) even if the content of other elements is within the range of the embodiment, and thereby, the iron loss of the grain oriented electrical steel sheet deteriorates. Thus, the C content is to be 0.010% or less. The upper limit of the C content is preferably 0.006%, and more preferably 0.003%. It is favorable that the C content is as low as possible. Thus, the C content may be 0%. However, excessive reduction of the C content raises the production cost. Thus, the lower limit of the C content is preferably more than 0%, and more preferably 0.001%.

2.5 to 4.0% of Si

Silicon (Si) is the base element. Si increases electric resistance (specific resistance) of steel material and thereby decreases the iron loss of the grain oriented electrical steel sheet. When the Si content is less than 2.5%, phase transformation occurs in the steel during the final annealing even if the content of other elements is within the range of the embodiment, and thereby, the secondary recrystallization does not proceed sufficiently. As a result, the above effect is not sufficiently obtained. On the other hand, when the Si content is more than 4.0%, the steel sheet becomes brittle even if the content of other elements is within the range of the embodiment, and thereby, passability during the production significantly deteriorates. Thus, the Si content is to be 2.5 to 4.0%. The lower limit of the Si content is preferably 2.8%, more preferably 3.0%, and more preferably 3.2%. The upper limit of the Si content is preferably 3.7%, more preferably 3.6%, and more preferably 3.5%.

0.01 to 1.00% of Mn

Mn (manganese) is the base element. Mn increases the specific resistance of the grain oriented electrical steel sheet and thereby decreases the iron loss. Moreover, Mn increases hot workability and thereby suppresses the occurrence of cracks in hot rolling. Moreover, Mn bonds to S and/or Se and thereby forms fine MnS and/or fine MnSe. The fine MnS and/or fine MnSe become nuclei for precipitating fine AlN which act as the inhibitor. When a precipitation amount of fine MnS and fine MnSe is sufficient, an amount of AlN becomes sufficient. When the Mn content is less than 0.01%, a sufficient amount of fine MnS and fine MnSe are not precipitated even if the content of other elements is within the range of the embodiment. On the other hand, when the Mn content is more than 1.00%, the magnetic flux density and the iron loss of the grain oriented electrical steel sheet deteriorate even if the content of other elements is within the range of the embodiment. Thus, the Mn content is to be 0.01 to 1.00%. The lower limit of the Mn content is preferably 0.02%, more preferably 0.03%, and more preferably 0.05%. The upper limit of the Mn content is preferably 0.70%, more preferably 0.50%, more preferably 0.30%, and more preferably 0.10%.

0.010% or Less of N

Nitrogen (N) is the optional element. N forms AlN which acts as the inhibitor by bonding to Al in the production processes of the grain oriented electrical steel sheet. Thus, N is the essential element for slab which is the material of the grain oriented electrical steel sheet. However, N is removed from the steel sheet in the production processes of the grain oriented electrical steel sheet. When the N content is more than 0.010% of N as the average chemical composition, blister (void) tends to be formed excessively in the steel sheet even if the content of other elements is within the range of the embodiment. The blister causes coating defects, and the insulation of the grain oriented electrical steel sheet deteriorates. Thus, the N content is to be 0.010% or less. The upper limit of the N content is preferably 0.008%, more preferably 0.006%, and more preferably 0.004%. The N content may be 0%. However, it may be difficult to excessively reduce the N content. Thus, the lower limit of the N content is preferably 0.001% and more preferably 0.002%.

0.010% or Less of Sol Al

Acid-soluble aluminum (sol Al) is the optional element. The sol Al forms AlN which acts as the inhibitor by bonding to N in the production processes of the grain oriented electrical steel sheet. However, when the sol Al content is more than 0.010%, Al based precipitates remain in the steel sheet even if the content of other elements is within the range of the embodiment. In the case, the iron loss of the grain oriented electrical steel sheet deteriorates. Thus, the sol Al content is to be 0.010% or less. The upper limit of the sol Al content is preferably 0.008%, and more preferably 0.006%. The sol Al content may be 0%. However, it may be difficult to excessively reduce the Al content. Thus, the lower limit of the Al content is preferably 0.001% and more preferably 0.002%. In the embodiment, the sol Al indicates the acid-soluble Al, and thus, the sol Al content indicates the amount of the acid-soluble Al.

0.005 To 0.030% of Insol Al

Acid-insoluble aluminum (insol Al) is the base element. The insol Al is mainly derived from spinel ($MgAl_2O_4$) formed in the final annealing process described later. When the insol Al content is less than 0.005%, the spinel is sufficiently included in the glass film 11 even if the content of other elements is within the range of the embodiment, and thereby, the adhesion of the glass film 11 is insufficient. On the other hand, when the insol Al content is more than 0.030%, the spinel is excessively formed even if the content of other elements is within the range of the embodiment. In the case, the spinal is excessively included not only at the interface between the glass film 11 and the base steel sheet 10 but also inside the glass film 11. When the spinal is excessively included inside the glass film 11, the spinal causes the cracks of the glass film 11, and the adhesion of the glass film 11 deteriorates. Thus, the insol Al content is to be 0.005 to 0.030%. The lower limit of the insol Al content is preferably 0.006%, more preferably 0.007%, and more preferably 0.010%. The upper limit of the insol Al content is preferably 0.027%, more preferably 0.025%, and more preferably 0.020%.

The sol Al content and the insol Al content may be obtained by the following method. The sol Al content is obtained by a method for quantifying the acid-soluble aluminum based on JIS G1257-10-2:2013 (determination of aluminium—determination of acid-soluble aluminium). In addition, the insol Al content is defined as the value obtained by subtracting the above sol Al content from the total Al content which is obtained by a method for quantifying the total aluminum based on JIS G1257-10-1:2013 (determination of aluminium—flame atomization after decomposition with acids).

0.05 to 0.20% of Mg

Magnesium (Mg) is a constituent element (base element) of the glass film. Thus, the Mg content may be 0.05 to 0.20%. The upper limit of the Mg content is preferably 0.18%, and more preferably 0.16%. The lower limit of the Mg content is preferably 0.08%, and more preferably 0.10%.

0.05 to 0.40% of O

Oxygen (O) is the constituent element (base element) of the glass film. Thus, the O content may be 0.05 to 0.40%. The upper limit of the O content is preferably 0.30%, and more preferably 0.25%. The lower limit of the O content is preferably 0.10%, and more preferably 0.15%.

0 to 0.020% of Ti

Titanium (Ti) is the optional element. Ti promotes the formation of the glass film and preferably secures the coating adhesion. Thus, the Ti content may be 0 to 0.020%. The upper limit of the Ti content is preferably 0.015%, and more preferably 0.010%. The Ti content may be 0%. However, the lower limit of the Ti content is preferably 0.001%, more preferably 0.003%, and more preferably 0.005%.

0.010% or Less of S

Sulfur (S) is the optional element. S forms fine MnS which acts as the inhibitor by bonding to Mn in the production processes. Thus, S is the essential element for slab. However, S is removed from the steel sheet in the production processes of the grain oriented electrical steel sheet. When the S content is more than 0.010% as the average chemical composition, MnS remains in the base steel sheet 10 even if the content of other elements is within the range of the embodiment, and thereby, the iron loss deteriorates. Thus, the S content is to be 0.010% or less. The upper limit of the S content is preferably 0.008%, more preferably 0.006%, and more preferably 0.004%. The S content may be 0%. However, it may be difficult to excessively reduce the S content. Thus, the lower limit of the S content is preferably 0.001% and more preferably 0.002%.

0.030% or Less of P

Phosphorus (P) is the optional element. P decreases the workability of the steel sheet during rolling. When the P content is more than 0.030%, the workability of the steel sheet excessively decreases even if the content of other elements is within the range of the embodiment. Thus, the P content is to be 0.030% or less. The upper limit of the P content is preferably 0.020%, and more preferably 0.010%. The P content may be 0%. However, it may be difficult to excessively reduce the P content. Thus, the lower limit of the P content is preferably 0.001%. Herein, P improves the texture and thereby, the magnetic characteristics of the steel sheet are improved. In order to favorably obtain the effects, the lower limit of the P content is preferably 0.002%, and more preferably 0.005%.

The grain oriented electrical steel sheet according to the embodiment may include the impurities as the average chemical composition. The impurities correspond to elements which are contaminated during industrial production of the grain oriented electrical steel sheet from ores and scrap that are used as a raw material, which are contaminated from environment of the production process, or which are remained in the steel without being completely purified by purification annealing. Also, the impurities correspond to elements which are allowed within a range that does not adversely affect the grain oriented electrical steel sheet according to the embodiment.

The grain oriented electrical steel sheet according to the embodiment may include, as the average chemical composition, at least one element selected from the group consisting of Cr, Sn, Cu, Bi, Se, and Sb, as substitution for a part of Fe which is the balance.

0 to 0.50% of Cr

Chrome (Cr) is the optional element. Thus, the Cr content may be 0%. When Cr is included, Cr improves the adhesion of the glass film 11 to the base steel sheet 10 as with Sn and Cu. Moreover, Cr increases the alignment degree to the Goss orientation of grains. When a small amount of Cr is included, the effect may be obtained. However, when the Cr content is more than 0.50%, Cr forms Cr oxides even if the content of other elements is within the range of the embodiment, and thereby, the magnetic characteristics of the grain oriented electrical steel sheet 1 deteriorate. Thus, the Cr content may be 0 to 0.50%. The upper limit of the Cr content is preferably 0.40%, more preferably 0.30%, more preferably 0.20%, and more preferably 0.10%. The lower limit of the Cr content is preferably more than 0%, more preferably 0.01%, more preferably 0.03%, and more preferably 0.05%.

0 to 0.50% of Sn

Tin (Sn) is the optional element. Thus, the Sn content may be 0%. When Sn is included, Sn improves the adhesion of the glass film 11 to the base steel sheet 10 as with Cr and Cu. When a small amount of Sn is included, the effect may be obtained. However, when the Sn content is more than 0.50%, the secondary recrystallization becomes unstable during producing the grain oriented electrical steel sheet 1 even if the content of other elements is within the range of the embodiment, and thereby, the magnetic characteristics of the grain oriented electrical steel sheet 1 deteriorate. Thus, the Sn content may be 0 to 0.50%. The lower limit of the Sn content is preferably more than 0%, more preferably 0.01%, more preferably 0.02%, and more preferably 0.03%.

0 to 0.50% of Cu

Copper (Cu) is the optional element. Thus, the Cu content may be 0%. When Cu is included, Cu improves the adhesion of the glass film 11 to the base steel sheet 10 as with Cr and Sn. When a small amount of Cu is included, the effect may be obtained. However, when the Cu content is more than 0.50%, the hot workability deteriorates during producing the grain oriented electrical steel sheet 1 even if the content of other elements is within the range of the embodiment. Thus, the Cu content may be 0 to 0.50%. The lower limit of the Cu content is preferably more than 0%, more preferably 0.01%, more preferably 0.03%, and more preferably 0.05%. The upper limit of the Cu content is preferably 0.40%, more preferably 0.30%, more preferably 0.20%, and more preferably 0.10%.

0 to 0.0100% of Bi

Bismuth (Bi) is the optional element. Thus, the Bi content may be 0%. When Bi is included, Bi acts as the inhibitor as with Se and Sb, and thus, the secondary recrystallization is made stable during producing the grain oriented electrical steel sheet 1. As a result, the magnetic characteristics of the grain oriented electrical steel sheet 1 are improved. When a small amount of Bi is included, the effect may be obtained. However, when the Bi content is more than 0.0100%, the adhesion of the glass film 11 to the base steel sheet 10 deteriorates even if the content of other elements is within the range of the embodiment. Thus, the Bi content may be 0 to 0.0100%. The lower limit of the Bi content is preferably more than 0%, more preferably 0.0010%, and more preferably 0.0020%. The upper limit of the Bi content is preferably 0.0090%, more preferably 0.0070%, and more preferably 0.0050%.

0 to 0.020% of Se

Selenium (Se) is the optional element. Thus, the Se content may be 0%. When Se is included, Se acts as the inhibitor as with Bi and Sb, and thus, the secondary recrystallization is made stable during producing the grain oriented electrical steel sheet 1. As a result, the magnetic characteristics of the grain oriented electrical steel sheet 1 are improved. When a small amount of Se is included, the effect may be obtained. However, when the Se content is more than 0.020%, the adhesion of the glass film 11 to the base steel sheet 10 deteriorates even if the content of other elements is within the range of the embodiment. Thus, the Se content may be 0 to 0.020%. The lower limit of the Se content is preferably more than 0%, more preferably 0.001%, more preferably 0.003%, and more preferably 0.005%. The upper limit of the Se content is preferably 0.015%, more preferably 0.010%, and more preferably 0.008%.

0 to 0.50% of Sb

Antimony (Sb) is the optional element. Thus, the Sb content may be 0%. When Sb is included, Sb acts as the inhibitor as with Bi and Se, and thus, the secondary recrystallization is made stable during producing the grain oriented electrical steel sheet 1. As a result, the magnetic characteristics of the grain oriented electrical steel sheet 1 are improved. When a small amount of Sb is included, the effect may be obtained. However, when the Sb content is more than 0.50%, the adhesion of the glass film 11 to the base steel sheet 10 deteriorates even if the content of other elements is within the range of the embodiment. Thus, the Sb content may be 0 to 0.50%. The lower limit of the Sb content is preferably more than 0%, more preferably 0.01%, more preferably 0.03%, and more preferably 0.05%. The upper limit of the Sb content is preferably 0.40%, more preferably 0.30%, more preferably 0.20%, and more preferably 0.10%.

Moreover, in the grain oriented electrical steel sheet 1 according to the embodiment, it is preferable that the average chemical composition includes, by mass %, at least one element selected from the group consisting of:

0.01 to 0.50% of Cr;
0.01 to 0.50% of Sn;
0.01 to 0.50% of Cu;
0.0010 to 0.0100% of Bi;
0.001 to 0.020% of Se; and
0.01 to 0.50% of Sb.

As explained above, Cr, Sn, and Cu favorably improve the adhesion of the glass film 11. Thus, the average chemical composition may include at least one element selected from the group consisting of: 0.01 to 0.50% of Cr; 0.01 to 0.50% of Sn; and 0.01 to 0.50% of Cu. Moreover, as explained above, Bi, Se, and Sb favorably improve the magnetic characteristics of the grain oriented electrical steel sheet 1. Thus, the average chemical composition may include at least one element selected from the group consisting of: 0.0010 to 0.0100% of Bi; 0.001 to 0.020% of Se; and 0.01 to 0.50% of Sb.

(Glass Film 11)

The glass film 11 is formed on the base steel sheet 10. The glass film 11 mainly includes forsterite ($Mg_2SiO_4$). In order to confirm the existence of the glass film 11 in the grain oriented electrical steel sheet according to the embodiment, the X-ray diffraction may be conducted for the surface after removing the tension-insulation coating 12 by the above method, and the obtained X-ray diffraction spectrum may be collated with PDF (Powder Diffraction File). The forsterite ($Mg_2SiO_4$) may be identified by JCPDS No. 34-189. In the embodiment, when the primal constituent phase in the above X-ray diffraction spectrum is the forsterite, the grain oriented electrical steel sheet 1 is judged to include the glass film 11.

For instance, the amount of the forsterite in the glass film 11 may be 60.0 mass % or more.

The thickness of the glass film 11 is not particularly limited. The lower limit of the thickness of the glass film 11 is preferably 1.0 µm, and more preferably 2.0 µm. The upper limit of the thickness of the glass film 11 is preferably 5.0 µm, and more preferably 4.0 µm.

(Tension-Insulation Coating 12)

The tension-insulation coating 12 is formed on the glass film 11. The tension-insulation coating 12 is formed as outermost layer for the grain oriented electrical steel sheet 1, in order to ensure the electrical insulation between the grain oriented electrical steel sheets 1 which are laminated to each other, when plural grain oriented electrical steel sheets 1 are utilized after being laminated.

In order to confirm the existence of tension-insulation coating 12 in the grain oriented electrical steel sheet according to the embodiment, quantitative analysis of SEM-EDS may be conducted on the outermost layer of the grain oriented electrical steel sheet 1 to confirm the chemical composition. For instance, when the quantitative analysis results of SEM-EDS satisfy the Fe content of less than 80 atomic %, the P content of 5 atomic % or more, the Si content of less than 20 atomic %, the O content of 50 atomic % or more, and the Mg content of 10 atomic % or less excluding the measurement noise, the grain oriented electrical steel sheet 1 is judged to include the tension-insulation coating 12.

For instance, the tension-insulation coating 12 is formed by applying the insulation coating solution including at least one of inorganics such as metal chromate, metal phosphate, colloidal silica, polytetrafluoroethylene, Zr compound, and Ti compound and by baking it. The insulation coating solution may mainly include phosphate compound. For instance, the insulation coating solution may include the phosphate compound of 80 mass % or more.

In addition to the phosphate compound, the insulation coating solution for forming the tension-insulation coating 12 may include at least one selected from the group consisting of the colloidal silica and the polytetrafluoroethylene. For instance, the phosphate compound is sodium phosphate, aluminum phosphate, magnesium phosphate, and the like.

The thickness of the tension-insulation coating 12 is not particularly limited. The lower limit of the thickness of the tension-insulation coating 12 is preferably 0.1 µm, and more preferably 0.5 µm. The upper limit of the thickness of the tension-insulation coating 12 is preferably 10.0 µm, and more preferably 5.0 µm.

(Localized Degree of Spinel ($MgAl_2O_4$) in Glass Film 11)

In the grain oriented electrical steel sheet 1 according to the embodiment, the spinel ($MgAl_2O_4$) is localized near the interface with the base steel sheet 10 in the glass film 11. Specifically, the glow discharge emission spectroscopy is conducted from the surface of the glass film 11 toward the depth direction after removing the tension-insulation coating 12, and the glow emission spectroscopic spectrums showing the Al emission intensity and the Si emission intensity (GDS spectrum of Al, GDS spectrum of Si) are measured. Ts which is an analysis starting time is defined as the surface of the glass film, $T^{Al}_p$ is defined as a time at which Al shows a maximum emission intensity in the GDS spectrum of Al, $F(T^{Al}_p)$ is defined as an Al emission intensity at the $T^{Al}_p$ (specifically, maximum emission intensity of Al), $T^{Si}_p$ is defined as a time at which Si shows a maximum emission intensity in the GDS spectrum of Si, and $F(T^{Si}_p)$ is defined as an Al emission intensity at the $T^{Si}_p$ (specifically, $F(T^{Si}_p)$ is defined as the Al emission intensity at the peak position of the Si emission intensity). the Ts, the $T^{Al}_p$, the $F(T^{Al}_p)$, the $T^{Si}_p$, and the $F(T^{Si}_p)$ satisfy the expression (1) and the expression (2).

$$0.05 \leq F(T^{Si}_p)/F(T^{Al}_p) \leq 0.50 \quad \text{(expression 1)}$$

$$2.0 \leq (T^{Al}_p - Ts)/(T^{Si}_p - Ts) \leq 5.0 \quad \text{(expression 2)}$$

Hereinafter, the expression (1) and the expression (2) are explained.

(Expression (1))

In the grain oriented electrical steel sheet 1 according to the embodiment, the spinel ($MgAl_2O_4$) is distributed in the glass film 11 in the thickness direction of the glass film 11, and the distribution of the spinel shows a peak near the interface with the base steel sheet 10 in the glass film 11. Specifically, the GDS spectrum of Al has the peak near the interface with the base steel sheet 10 in the glass film 11. In the grain oriented electrical steel sheet 1 according to the embodiment, as the peak of the GDS spectrum of Al near the interface between the glass film 11 and the base steel sheet 10 becomes sharp, the spinel is judged to be localized near the interface between the glass film 11 and the base steel sheet 10.

Figure 3:
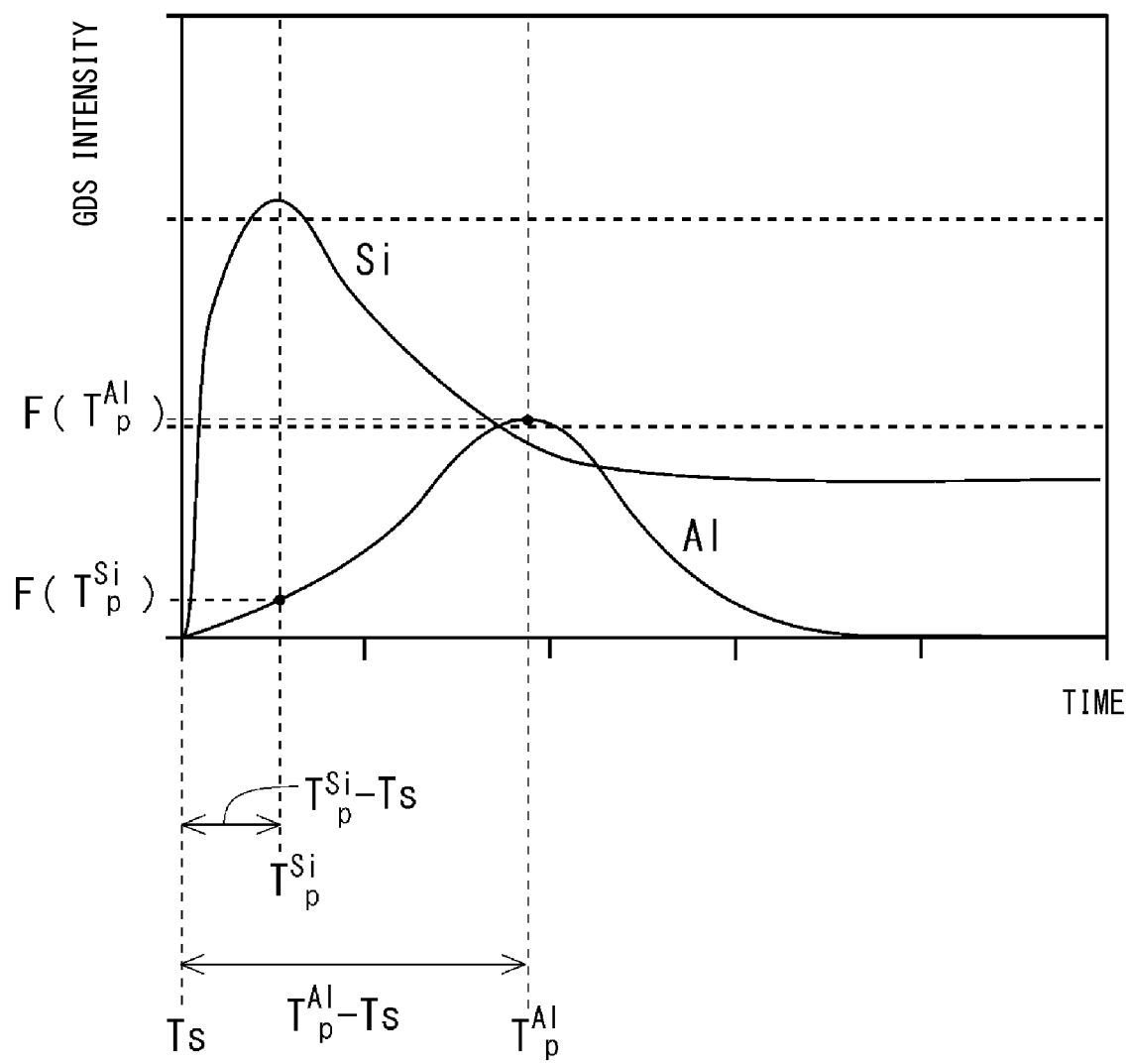
FIG. 3 is an illustration showing glow emission spectroscopic spectrums of Al and Si obtained by a glow discharge emission spectroscopy.

FIG. 3 shows the glow emission spectroscopic spectrums of Al and Si (GDS spectrum of Al and GDS spectrum of Si) in a case that Ts which is the analysis starting time is regarded as the surface of the glass film 11, a horizontal axis is an analysis time (unit: second), and a vertical axis is an emission intensity (GDS intensity) (unit: arbitrary unit). The time Ts, the time $T_{Al}^p$, the emission intensity $F(T^{Al}_p)$, the time $T^{Si}_p$, and the emission intensity $F(T^{Si}_p)$ shown in FIG. 3 are defined as follows.

Analysis Starting Time Ts

In the glow emission spectroscopic spectrum, the Ts which is an analysis starting time is defined as the surface of the glass film 11.

Time $T^{Al}_p$

The glow discharge emission spectroscopy is conducted from the surface of the glass film 11 toward the depth direction after removing the tension-insulation coating 12 of the grain oriented electrical steel sheet 1, and the glow emission spectroscopic spectrum of Al (GDS spectrum of Al) showing the relationship between the analysis time and the Al emission intensity is measured is a case that Ts which is the analysis starting time is regarded as the surface of the glass film 11. Herein, the analysis time corresponds to the depth from the surface of the glass film 11. For the obtained GDS spectrum of Al, the maximum value of the emission intensity and the time at the maximum value are confirmed. The confirmed time is defined as the time $T^{Al}_p$. Specifically, the time $T^{Al}_p$ corresponds to the depth position (the depth position from the surface of the glass film 11) where Al concentration (GDS intensity of Al) shows peak.

Emission Intensity $F(T^{Al}_p)$

The maximum value of the Al emission intensity in the glow emission spectroscopic spectrum of Al (GDS spectrum of Al), specifically the maximum Al emission intensity at the time $T^{Al}_p$ is defined as the $F(T^{Al}_p)$.

Time $T^{Si}_p$

The glow discharge emission spectroscopy is conducted from the surface of the glass film 11 toward the depth direction after removing the tension-insulation coating 12 of the grain oriented electrical steel sheet 1, and the glow emission spectroscopic spectrum of Si (GDS spectrum of Si) showing the relationship between the analysis time and the Si emission intensity is measured is a case that Ts which is the analysis starting time is regarded as the surface of the glass film 11. As explained above, the analysis time corresponds to the depth from the surface of the glass film 11. For the obtained GDS spectrum of Si, the maximum value of the emission intensity and the time at the maximum value are confirmed. The confirmed time is defined as the time $T^{Si}_p$. Specifically, the time $T^{Si}_p$ corresponds to the depth position (the depth position from the surface of the glass film 11) where Si concentration (GDS intensity of Si) shows peak.

Emission intensity $F(T^{Si}_p)$

The Al emission intensity at the time $T^{Si}_p$ in the glow emission spectroscopic spectrum of Al (GDS spectrum of Al) is defined as the $F(T^{Si}_p)$.

The main component of the glass film 11 is forsterite ($Mg_2SiO_4$). Thus, the GDS spectrum of Si shows a peak at the center of the glass film 11 in the depth direction. Specifically, the time $T^{Si}_p$ corresponds to the center position of the glass film 11 in the depth direction. In other word, the $F(T^{Si}_p)$ represents the Al concentration at the center position of the glass film 11 in the depth direction.

It is defined that $F1=F(T^{Si}_p)/F(T^{Al}_p)$. The F1 represents the ratio of the maximum Al concentration ($F(T^{Al}_p)$) in the glass film 11 to the typical Al concentration ($F(T^{Si}_p)$) in the region excluding the peak position of Al concentration in the glass film 11. The F1 is an index indicating the localized degree of the spinel in the glass coating 11.

When the F1 is less than 0.05, the spinel is excessively formed near the interface with the base steel sheet 10 in the glass film 11. The spinel which is localized near the interface with the base steel sheet 10 increases the coating adhesion. However, when the amount of the localized spinel is excessive, smoothness of the interface between the glass film 11 and the base steel sheet 10 deteriorates (in other word, unevenness increases). As a result, even when F2 explained below satisfies the expression (2), the magnetic characteristics deteriorate.

On the other hand, when the F1 is more than 0.50, the spinel exists not near the interface with the base steel sheet 10 in the glass film 11 but inside the glass film 11. Alternatively, although the spinel exists near the interface with the base steel sheet 10 in the glass film 11, the amount of formed spinel is insufficient. In the case, the coating adhesion of the glass film 11 to the base steel sheet 10 deteriorates.

When the F1 is 0.05 to 0.50, in other word, when the F1 satisfies the expression (1), the appropriate amount of the spinel exists near the interface with the base steel sheet 10 in the glass film 11. Thus, on the premise of satisfying the expression (2), the coating adhesion of the glass film 11 to the base steel sheet 10 is improved.

(Expression (2))

It is defined that $F2=(T^{Al}_p-Ts)/(T^{Si}_p-Ts)$. As shown in FIG. 3, the F2 represents the relationship between the peak position of Al concentration and the peak position of Si concentration (specifically, the center position of the glass film 11 in the depth direction). The F2 is an index indicating the localized position of the spinel in the glass film 11.

When the F2 is less than 2.0, the peak position of Al concentration is located inside the glass film 11 rather than near the interface with the base steel sheet 10 in the glass film 11. Specifically, the spinel is not localized near the interface with the base steel sheet 10 but exists inside the glass film 11. In the case, the F1 also exceeds the upper limit of the expression (1), and as a result, the adhesion of the glass film 11 to the base steel sheet 10 deteriorates. On the other hand, when the F2 is more than 5.0, the amount of formed glass film 11 is very insufficient as compared with the amount of formed spinel. In other word, the glass film 11 is thinned. In the case, even when the F1 satisfies the expression (1), the tension of the glass film 11 which is required for magnetic domain refinement decreases. As a result, the iron loss deteriorates and the coating adhesion also deteriorates.

At present, the detailed reason why the adhesion of the glass film 11 to the base steel sheet 10 is improved when the appropriate amount of the spinel is formed near the interface with the base steel sheet 10 in the glass film 11 is not clear. However, the following reason is assumed. The fine unevenness is formed on the surface of the base steel sheet 10. When the spinel is localized near the interface with the base steel sheet 10 in the glass film 11, the spinel is intruded into the concavity of surface unevenness of the base steel sheet 10. Thus, it seems that the spinel acts as the anchor and the adhesion of the glass film 11 to the base steel sheet 10 is improved. A mechanism different from the above mechanism may increase the adhesion of the glass film 11 to the base steel sheet 10. However, from the examples explained below, it is confirmed that, when the F1 satisfies the expression (1) and the F2 satisfies the expression (2), the adhesion of the glass film 11 to the base steel sheet 10 is increased.

(Obtaining Method of F1 and F2)

Figure 4:
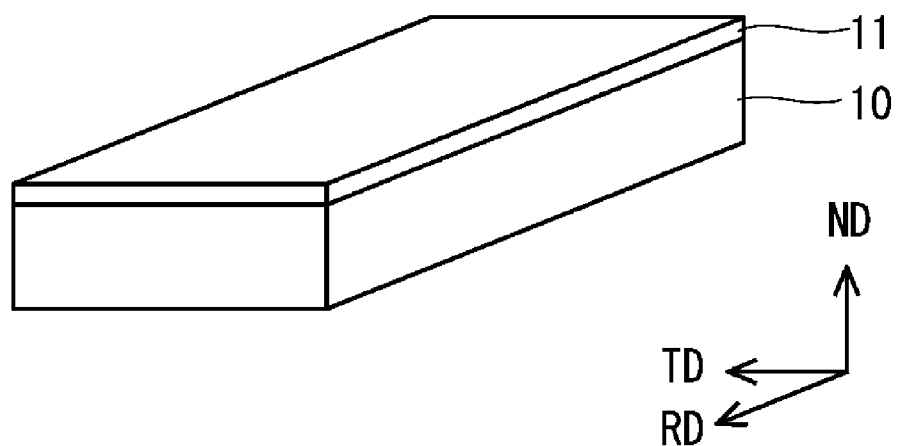
FIG. 4 is a perspective illustration showing a state in which the tension-insulation coating is removed from the grain oriented electrical steel sheet according to the embodiment.

The F1 and the F2 may be obtained by the following method. Firstly, from the center region of the grain oriented electrical steel sheet 1 in the transverse direction TD, a sample whose size is 30 mm in the rolling direction RD, 40 mm in the transverse direction TD, and thickness of the grain oriented electrical steel sheet 1 is taken. The tension-insulation coating 12 is removed from the above sample. Specifically, the grain oriented electrical steel sheet 1 is immersed in sodium hydroxide aqueous solution which includes 30 to 50 mass % of NaOH and 50 to 70 mass % of $H_2O$ at 80 to 90° C. for 7 to 10 minutes. The steel sheet after immersing (the base steel sheet 10 with the glass film 11 after removing the tension-insulation coating 12) is water-washed. The steel sheet after water-washing is dried by a warm air blower for approximately less than 1 minute. By the above treatment, the sample with the base steel sheet 10 and the glass film 11 and without the tension-insulation coating 12 is obtained as shown in FIG. 4.

The glow discharge emission spectroscopy (GDS: Glow Discharge Spectromety) is conducted from the surface of the glass film 11 of the sample toward the depth direction, and the glow emission spectroscopic spectrums (GDS spectrums) of Al and Si are measured. Specifically, using high frequency glow emission spectroscope (GD-ODS), the GDS spectrum of Al and the GDS spectrum of Si in the depth direction on the glass film 11 are measured under conditions such that electric power of 30 W is applied to the sample as a cathode in an argon atmosphere (Ar pressure: 3 hPa). Herein, the measurement area is 4 mmφ, the measurement time is 100 seconds, and the measurement interval is 0.02 seconds.

It is preferable that the F1 and the F2 are obtained after smoothing the measured GDS spectrum. For instance, as the method for smoothing the GDS spectrum, a simple moving average method may be used.

From the obtained GDS spectrum of Al, $T^{Al}_p$ which is the time at which Al shows the maximum emission intensity and $F(T^{Al}_p)$ which is the Al emission intensity at the time $T^{Al}_p$ are measured.

Moreover, from the obtained GDS spectrum of Si, $T^{Si}_p$ which the time at which Si shows the maximum emission intensity is measured. Thereafter, from the GDS spectrum of Al, $F(T^{Si}_p)$ which is the Al emission intensity at the time $T^{Si}_p$ is measured. The analysis starting time is Ts. Using the time Ts, the time $T^{Al}_p$, the $F(T^{Al}_p)$, the time $T^{Si}_p$, and the $F(T^{Si}_p)$, the F1 and the F2 are obtained.

In the grain oriented electrical steel sheet 1 according to the embodiment, the F1 satisfies the expression (1) and the F2 satisfies the expression (2). Thus, the appropriate amount of the spinel is localized near the interface with the base steel sheet 10 in the glass film 11, and thereby, the adhesion of the glass film 11 to the base steel sheet 10 is increased.

Herein, when the F1 satisfies the expression (1) and the F2 satisfies the expression (2), it is possible to judge that the spinel is localized near the interface with the base steel sheet 10 in the glass film 11.

Moreover, by the following feature, it may be judged whether or not the spinel is localized near the interface with the base steel sheet 10 in the glass film 11.

When the glow emission spectroscopic spectrums of Al and Fe are measured by conducting the glow discharge emission spectroscopy from the surface of the glass film 11 toward the depth direction, when $T^{Al}_p$ is regarded as the time at which Al shows the maximum emission intensity, when $T^{Fe}_{60}$ is regarded as the time at which the Fe emission intensity becomes 60% as compared with the saturation value of Fe emission intensity, and when $T^{Fe}_{90}$ is regarded as the time at which the Fe emission intensity becomes 90% as compared with the saturation value of Fe emission intensity, the $T^{Al}_p$, the $T^{Fe}_{60}$, and the $T^{Fe}_{90}$ may satisfy $$T^{Fe}_{60} \leq T^{Al}_p \leq T^{Fe}_{90} \qquad \text{(expression 3)}$$

When the expression (3) is satisfied in addition to the expression (1) and the expression (2), it is possible to judge that the spinel is localized near the interface with the base steel sheet 10 in the glass film 11, which is preferable. Herein, the above "the saturation value of Fe emission intensity" may be regarded as, for instance, the Fe emission intensity at 100 seconds after starting the measurement of the glow discharge emission spectroscopy.

(Producing Method)

Hereinafter, the method for producing the grain oriented electrical steel sheet according to the embodiment is explained for instance. In the grain oriented electrical steel sheet 1 according to the embodiment, in so far as the above features are included, the producing method is not particularly limited. The following producing method is an instance for producing the grain oriented electrical steel sheet 1 according to the embodiment and is a favorable instance for producing the grain oriented electrical steel sheet 1 according to the embodiment.

(Flow of Production Processes)

Figure 5:
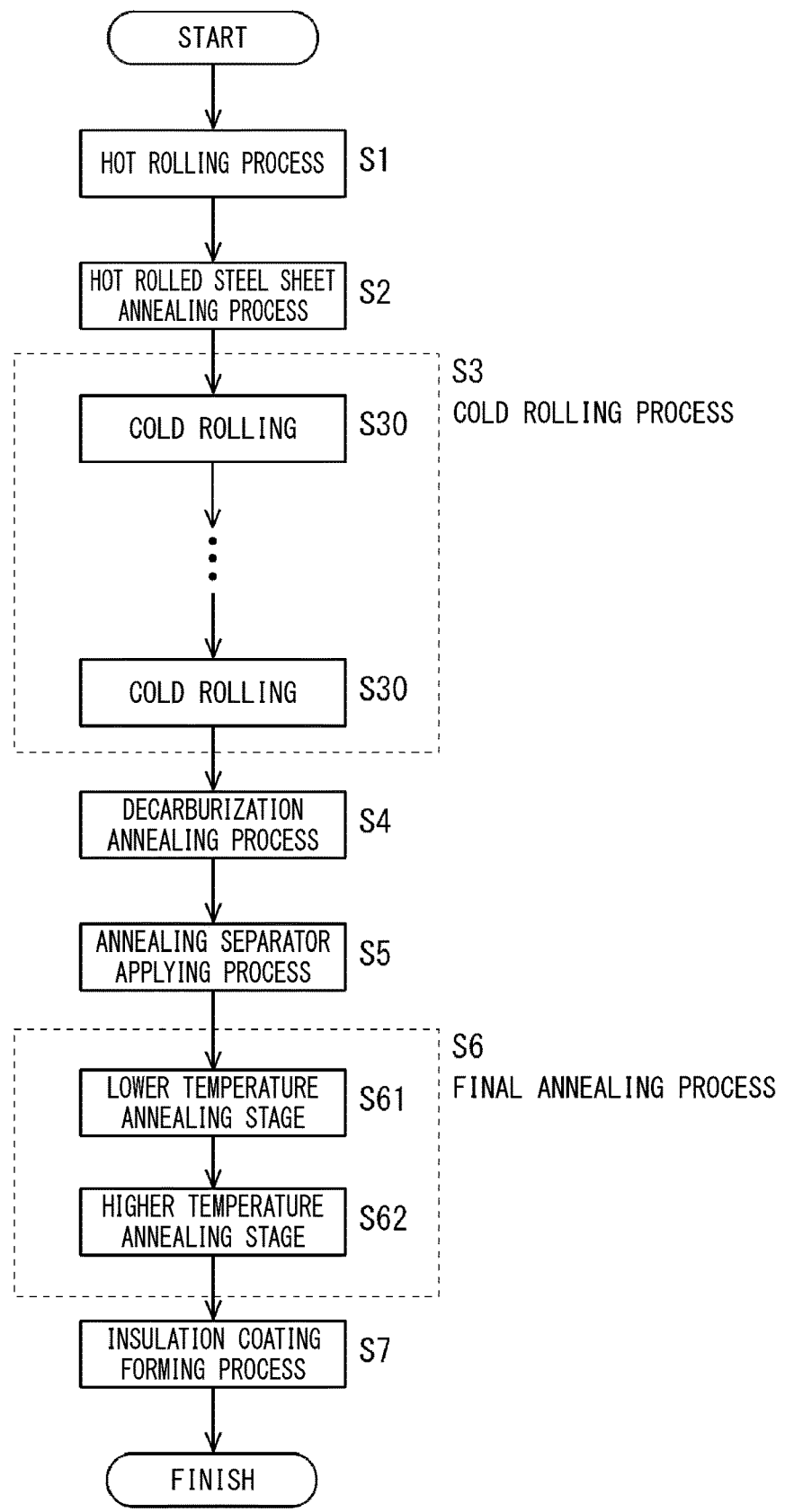
FIG. 5 is a flow chart showing an instance of production processes of the grain oriented electrical steel sheet according to the embodiment.

FIG. 5 is a flow chart showing the method for producing the grain oriented electrical steel sheet 1 according to the embodiment. As shown in FIG. 5, the producing method includes: (S1) a hot rolling process of hot-rolling a slab, (S2) a hot rolled steel sheet annealing process of annealing the steel sheet (hot rolled steel sheet) after hot rolling; (S3) a cold rolling process of cold-rolling (S30) once or plural times the steel sheet after hot rolled steel sheet annealing; (S4) a decarburization annealing process of decarburizing the steel sheet (cold rolled steel sheet) after cold rolling; (S5) an annealing separator applying process of applying the annealing separator to the surface of the steel sheet after decarburization annealing: (S6) a final annealing process of final-annealing the steel sheet after applying the annealing separator in order to form the glass film; and (S7) an insulation coating forming process of forming the tension-insulation coating for the steel sheet after final annealing. Hereinafter, each process of S1 to S7 is explained.

(Hot Rolling Process (S1))

In the hot rolling process (S1), a prepared slab is hot-rolled in order to produce the hot rolled steel sheet. The chemical composition of the slab is adjusted so that the average chemical composition of the base steel sheet 10 and the glass film 11 of the grain oriented electrical steel sheet 1 satisfies the above chemical composition. Herein, the Al content of slab is to be 0.01 mass % or more. When the Al content of slab is less than 0.01 mass %, the spinel is not formed sufficiently in the glass film 11. The slab may be produced by known method. For instance, a molten steel is made (a steel is melted). Using the molten steel, the slab is made by continuous casting.

The prepared slab is hot-rolled by a hot rolling mill, and thereby, the steel sheet (hot rolled steel sheet) is produced. At first, steel piece is heated. For instance, the slab is put and heated in a known heating furnace or a known soaking furnace. The heating temperature of slab is preferably 1100 to 1450° C. The lower limit of the heating temperature of slab is preferably 1300° C. The upper limit of the heating temperature of slab is preferably 1400° C.

The heated slab is hot-rolled by the hot rolling mill, and thereby, the steel sheet (hot rolled steel sheet) is produced. The hot rolling mill includes a rough rolling mill and a final rolling mill which is arranged downstream of the rough rolling mill. The rough rolling mill includes one rough rolling stand or plural rough rolling stands which are in a row. Each rough rolling stand includes plural rolls arranged one above the other. The rough rolling stand may be a reverse type. In a case where the rough rolling stands are arranged, the rough rolling mill may be a tandem type or a reverse type. The final rolling mill includes final rolling stands which are in a row. Each final rolling stand has plural rolls arranged one above the other. The heated slab is rolled by the rough rolling mill and then by the final rolling mill, and thereby, the hot rolled steel sheet is obtained.

The thickness of hot rolled steel sheet produced by hot rolling is not particularly limited and may be known thickness. For instance, the thickness of hot rolled steel sheet may be 2.0 to 3.0 mm.

(Hot Rolled Steel Sheet Annealing Process (S2))

The hot rolled steel sheet annealing process (S2) is optional and may be not conducted. When the hot rolled steel sheet annealing is conducted, in the hot rolled steel sheet annealing process (S2), the hot rolled steel sheet produced by the hot rolling process (S1) is annealed in order to obtain the steel sheet after hot rolled steel sheet annealing. By conducting the hot rolled steel sheet annealing, the recrystallization occurs in the steel structure, and thereby, the magnetic characteristics are improved.

The hot rolled steel sheet annealing process (S2) may be conducted by known method. The heating method for the hot rolled steel sheet is not particularly limited and may be known method. For instance, the annealing temperature is preferably 900 to 1200° C., and the holding time in the annealing temperature is preferably 10 to 300 seconds. When the hot rolled steel sheet annealing process (S2) is conducted, pickling may be conducted for the hot rolled steel sheet after the hot rolled steel sheet annealing process (S2) and before the cold rolling process (S3).

(Cold Rolling Process (S3))

In the cold rolling process (S3), the produced steel sheet (the hot rolled steel sheet or the steel sheet after hot rolled steel sheet annealing) is cold-rolled (S30) once or plural times. The cold rolling (S30) is conducted using a cold rolling mill. For instance, the cold rolling mill is the tandem type which includes plural cold rolling stands which are in a row, and each cold rolling stand includes plural rolls for cold rolling. The cold rolling mill may be cold rolling stand which is one reverse type.

In the cold rolling process (S3), the cold rolling (S30) may be conducted as once or plural times. When the cold rolling is conducted plural times, an intermediate annealing to soften the steel sheet may be conducted after cold rolling using the cold rolling mill. In the case, after intermediate annealing, post cold rolling is conducted. In other word, the intermediate annealing may be conducted between cold rolling.

The intermediate annealing between cold rolling and next cold rolling may be conducted under known conditions. For instance, the annealing temperature of intermediate annealing is preferably 950 to 1200° C., and the holding time in the annealing temperature is preferably 30 to 1800 seconds. The strain introduced into the steel sheet by previous cold rolling is reduced (the steel sheet is softened) by the intermediate annealing, and then next cold rolling is conducted.

In a case where the cold rolling is conducted plural times without conducting the intermediate annealing, it may be difficult to control the characteristics uniform in the produced grain oriented electrical steel sheet. On the other hand, in a case where the cold rolling is conducted plural times with conducting the intermediate annealing between cold rolling, the magnetic flux density may decrease in the produced grain oriented electrical steel sheet 1. Thus, the number of cold rolling and the operation of intermediate annealing are determined according to the characteristics required for the produced grain oriented electrical steel sheet 1 and the production cost thereof.

As explained above, the cold rolling may be conducted once.

The cumulative cold rolling reduction in cold rolling once or plural times is preferably 80 to 95%. Herein, the cumulative cold rolling reduction is defined as follows.

Cold rolling reduction (%)=((Sheet thickness of steel sheet before first cold rolling−Sheet thickness of cold rolled steel sheet after final cold rolling)/Sheet thickness of steel sheet before first cold rolling)×100

In a case where the cold rolling is conducted only once in the cold rolling process, the above cold rolling reduction is the cold rolling reduction in cold rolling only once. When the cumulative cold rolling reduction is 80% or more, it is possible to sufficiently form recrystallization nuclei (Goss nuclei) having Goss orientation ({110}<001> orientation). Moreover, when the cumulative cold rolling reduction is 95% or less, the secondary recrystallization may be made stable during the final annealing process (S6) explained below. The steel sheet produced in the cold rolling process is coiled in a coil shape.

In general, the thickness of cold rolled steel sheet (thickness after cold rolling process (S3)) is different from the thickness of grain oriented electrical steel sheet 1 which is final product (thickness of product including those of glass film 11 and tension-insulation coating 12).

In order to further improve the magnetic characteristics, aging treatment may be conducted in the cold rolling process (S3). The aging treatment is optional. In a case where the aging treatment is conducted, the aging (annealing) treatment is conducted between plural cold rolling (S30). Specifically, the aging treatment is conducted after conducting cold rolling (S30), and then, next cold rolling (S30) is conducted after the aging treatment. The aging treatment may be conducted under known conditions. For instance, the heat treatment as the aging treatment is conducted for 60 seconds or more at the temperature of 100 to 500° C. for the steel sheet after conducting cold rolling (S30). In the case, it is possible to finally obtain favorable secondary recrystallized structure which aligns in the Goss orientation.

(Decarburization Annealing Process (S4))

In the decarburization annealing process (S4), the steel sheet (cold rolled steel sheet) after the cold rolling process (S3) is decarburization-annealed, and thereby the primary recrystallization is made to occur.

The decarburization annealing process (S4) includes a heating stage (S41), a decarburizing stage (S42), and a cooling stage (S43). In the heating stage (S41), the steel sheet is heated to the decarburization annealing temperature Ta. In the decarburizing stage (S42), the steel sheet which is heated to the decarburization annealing temperature Ta is decarburization-annealed, and thereby the primary recrystallization is made to occur. In the cooling stage (S43), the steel sheet after the decarburizing stage (S42) is cooled by known method. Hereinafter, each stage is explained in detail.

(Heating Stage (S41))

In the heating stage, at first, the steel sheet after the cold rolling process (S3) is put in a heat treatment furnace. In the heat treatment furnace for the decarburization annealing according to the embodiment, for instance, the cold rolled steel sheet is heated under control to the decarburization annealing temperature by high frequency induction heating or by electric heating. An atmosphere during the heating stage may be a dry nitrogen atmosphere or a dry mixed atmosphere of nitrogen and hydrogen, and may be an oxidation degree ($PH_2O/PH_2$) of 0.1 or less. When the oxidation degree in the heating stage is more than 0.1, Fe-based oxides tend to nucleate. The Fe-based oxides which are nucleated in the heating stage are grown during the decarburization annealing. When these oxides exist in the final annealing, the growth of forsterite ($Mg_2SiO_4$) is inhibited. Although the above reason is unclear, the Fe-based oxides have a function to suppress the solid-phase reaction between $SiO_2$ and MgO. As a result, $Mg_2SiO_4$ is thinned, and the spinel tends not to be localized near the interface with the base steel sheet 10 in the glass film 11. Specifically, the spinel ($MgAl_2O_4$) tends to exist in $Mg_2SiO_4$.

Moreover, although not particularly limited, the heating rate may be 2000° C./second or less, and the reaching temperature may be 700 to 1000° C. Herein, the reaching temperature is different from the decarburization annealing temperature Ta in the decarburizing stage.

(Decarburizing Stage (S42))

In the decarburizing stage (S42) of the decarburization annealing process (S4), the steel sheet after the heating stage (S41) is held at the decarburization annealing temperature Ta in order to conduct the decarburization annealing. Thereby, the primary recrystallization is made to occur. An atmosphere during the decarburizing stage may be a known atmosphere, for instance, a moist mixed atmosphere of nitrogen and hydrogen. By conducting the decarburization annealing, carbon in the steel sheet is removed from the steel sheet, and the primary recrystallization is made to occur. The production conditions in the decarburizing stage are as follows.

Decarburization Annealing Temperature Ta: 800 to 950° C.

As explained above, the decarburization annealing temperature Ta corresponds to a furnace temperature of the heat treatment furnace to conduct the decarburization annealing, and corresponds to a temperature of steel sheet during the decarburization annealing. When the decarburization annealing temperature Ta is less than 800° C., the grains of the steel sheet after the primary recrystallization become too fine. In the case, the secondary recrystallization does not occur sufficiently during the final annealing process (S6). On the other hand, when the decarburization annealing temperature Ta is more than 950° C., the grains of the steel sheet after the primary recrystallization become too coarse. Also, in the case, the secondary recrystallization does not occur sufficiently during the final annealing process (S6). When the decarburization annealing temperature Ta is 800 to 950° C., the grains of the steel sheet after the primary recrystallization become appropriate size, the secondary recrystallization occurs sufficiently during the final annealing process (S6).

The holding time in the decarburization annealing temperature Ta in the decarburizing stage (S42) is not particularly limited. For instance, the holding time in the decarburization annealing temperature Ta may be 15 to 150 seconds.

(Cooling Stage (S43))

In the cooling stage (S43), the steel sheet after the decarburizing stage (S42) is cooled to room temperature by known method. The cooling method may be air cooling, water cooling, and the like. It is preferable that the steel sheet after the decarburizing stage is air-cooled. In the decarburization annealing process (S4), the steel sheet is subjected to the decarburization annealing by conducting the above stages.

(Annealing Separator Applying Process (S5))

The steel sheet after the decarburization annealing process (S4) is subjected to the annealing separator applying process (S5). In the annealing separator applying process (S5), the annealing separator is applied to the surface of the steel sheet. Specifically, aqueous slurry including the annealing separator is applied to the surface of the steel sheet. The aqueous slurry is prepared by adding water to the annealing separator and by stirring it. The annealing separator includes magnesium oxide (MgO). It is preferable that MgO is the main component of the annealing separator. Herein, the "main component" indicates that the MgO content in the annealing separator is 80.0% or more in mass %. The annealing separator may include known additives in addition to MgO. For instance, the annealing separator may include Ti compound.

In the annealing separator applying process (S5), the aqueous slurry including the annealing separator is applied to the surface of the steel sheet. The steel sheet after applying the annealing separator to the surface thereof is coiled in a coil shape. The steel sheet after being coiled is subjected to the final annealing process (S6).

A baking treatment may be conducted after coiling the steel sheet in which the aqueous slurry including the annealing separator is applied to the surface thereof and before the final annealing process (S6). In the baking treatment, the coiled steel sheet is put and held in a furnace kept at 400 to 1000° C. (baking treatment). Thereby, the annealing separator which is applied to the steel sheet is dried. For instance, the holding time may be 10 to 90 seconds. The coiled steel sheet in which the annealing separator is applied may be subjected to the final annealing process without conducting the baking treatment.

(Final Annealing Process (S6))

The steel sheet after the annealing separator applying process (S5) is subjected to the final annealing process (S6), and thereby, the secondary recrystallization is made to occur. Moreover, in the final annealing process, two stages annealing (lower temperature annealing stage (S61) and higher temperature annealing stage (S62)) are conducted. Thereby, the glass film 11 which mainly includes the forsterite is formed, and the appropriate amount of the spinel is localized near the interface with the base steel sheet 10 in the glass film 11. The two stages annealing (lower temperature annealing stage (S61) and higher temperature annealing stage (S62)) are conducted in the heat treatment furnace. Hereinafter, the lower temperature annealing stage (S61) and the higher temperature annealing stage (S62) are explained.

(Lower Temperature Annealing Stage (S61))

The lower temperature annealing stage (S61) is to form the glass film 11. In the lower temperature annealing stage (S61), at first, the coiled steel sheet is put in the heat treatment furnace and is heated to the temperature T1 for the lower temperature annealing. The steel sheet is held in the temperature T1 for the holding time t1. An atmosphere in the furnace during the lower temperature annealing stage (S61) may be a mixed atmosphere of nitrogen and hydrogen.

The temperature T1 for the lower temperature annealing (° C.) and the holding time t1 in the lower temperature annealing stage (S61) are as follows.

Temperature T1 for the lower temperature annealing: 910 to 1000° C.

Holding time t1 in 910 to 1000° C.: 50 to 120 hours (Temperature T1 for Lower Temperature Annealing)

910 to 1000° C. is the temperature range where the forsterite ($Mg_2SiO_4$) which is the main component of the glass film 11 is formed.

When the temperature T1 for the lower temperature annealing is less than 910° C., the alumina is formed ($4Al+3SiO_2 \rightarrow 2Al_2O_3+3Si$) before the forsterite is formed ($2MgO+SiO_2 \rightarrow Mg_2SiO_4$). As a result, after the higher temperature annealing stage (S62), the spinal is included not near the interface with the base steel sheet 10 in the glass film 11 and but inside the glass film 11. Thus, the F1 does not satisfy the upper limit of the expression (1) and/or the F2 does not satisfy the lower limit of the expression (2).

When the temperature T1 for the lower temperature annealing is more than 1000° C., the forsterite is not sufficiently formed and the glass film 11 is thinned. Thus, although the F1 satisfies the expression (1), the F2 does not satisfy the upper limit of the expression (2). As a result, the tension of the glass film 11 which is required for magnetic domain refinement decreases. Thus, the iron loss deteriorates and the coating adhesion also deteriorates.

(Holding Time t1 in Temperature T1 for the Lower Temperature Annealing)

When the temperature T1 for the lower temperature annealing is appropriate, specifically the temperature T1 for the lower temperature annealing is 910 to 1000° C., and when the holding time t1 in the temperature T1 is less than 50 hours, the forsterite is not sufficiently formed and the glass film 11 is thinned. Thus, although the F1 satisfies the expression (1), the F2 does not satisfy the upper limit of the expression (2). As a result, the insulation deteriorates.

When the temperature T1 for the lower temperature annealing is appropriate and when the holding time t1 is more than 120 hours, the forsterite is excessively formed and Mg is consumed by forming the forsterite. In the case, Mg which is used to form the spinel ($MgAl_2O_4$) is insufficient, and the spinel is not sufficiently formed. Thus, although the F2 satisfies the expression (2), the F1 does not satisfy the upper limit of the expression (1).

On the premise that the temperature T1 for the lower temperature annealing is appropriate, the holding time t1 in the temperature T1 is to be 50 to 120 hours.

When the temperature T1 for the lower temperature annealing is 910 to 1000° C. and when the holding time t1 in the temperature T1 is 50 to 120 hours, the forsterite is sufficiently formed and grown, and the glass film 11 is sufficiently thickened. As a result, on the premise of satisfying conditions in the higher temperature annealing stage (S62) explained below, the spinel is localized near the interface with the base steel sheet 10 in the glass film 11, the F1 satisfies the expression (1), and the F2 satisfies the expression (2).

Herein, in the lower temperature annealing stage (S61), it is sufficient to hold the steel sheet for the holding time t1 in the temperature range of 910 to 1000° C. In other word, in so far as the holding time t1 in the temperature range of 910 to 1000° C. is 50 to 120 hours, the temperature during the holding time t1 may be constant, be increased, or be decreased.

(Higher Temperature Annealing Stage (S62))

The higher temperature annealing stage (S62) is to form the spinal in the glass film 11 which is formed in the lower temperature annealing stage (S61) and to localize the spinel near the interface with the base steel sheet 10. Specifically, after conducting the lower temperature annealing stage (S61), the steel sheet is further heated to the temperature T2 for the higher temperature annealing. The heating rate is not particularly limited. The steel sheet is held in the temperature T2 for the holding time t2 explained below. The higher temperature annealing stage may be conducted in the same heat treatment furnace as that of the lower temperature annealing stage or in a different heat treatment furnace. An atmosphere in the furnace during the higher temperature annealing stage may be a nitrogen atmosphere.

The temperature T2 for the higher temperature annealing (° C.) and the holding time t2 in the temperature T2 are as follows.

Temperature T2 for the higher temperature annealing: 1100 to 1300° C.

Holding time t2 in temperature T2: 20 to 80 hours (Temperature T2 for Higher Temperature Annealing)

1100 to 1300° C. is the temperature range where the spinel is formed. The glass film 11 is sufficiently formed by the lower temperature annealing stage. Thus, when the steel sheet is held in the temperature range of 1100 to 1300° C. during the higher temperature annealing stage, Al included in the base steel sheet 10 diffuses near the interface between the glass film 11 and the base steel sheet 10, and reacts to the forsterite. Thereby, the spinel is formed. The spinel is formed near the interface with the base steel sheet 10 in the glass film 11 during the higher temperature annealing stage, and thus the spinel is localized near the interface.

When the temperature T2 for the higher temperature annealing is less than 1100° C., the spinel is not sufficiently formed. In the case, although the F2 satisfies the expression (2), the F1 does not satisfy the upper limit of the expression (1).

When the temperature T2 for the higher temperature annealing is more than 1300° C., the spinel is excessively formed. In the case, although the F2 satisfies the expression (2), the F1 does not satisfy the lower limit of the expression (1).

Thus, the temperature T2 for the higher temperature annealing is to be 1100 to 1300° C.

(Holding Time t2 in 1100 to 1300° C.)

When the holding time t2 in 1100 to 1300° C. is less than 20 hours, the spinel is not sufficiently formed. In the case, although the F2 satisfies the expression (2), the F1 does not satisfy the upper limit of the expression (1).

When the holding time t2 in 1100 to 1300° C. is more than 80 hours, the spinel is excessively formed. In the case, although the F2 satisfies the expression (2), the F1 does not satisfy the lower limit of the expression (1).

Thus, the holding time t2 in 1100 to 1300° C. is to be 20 to 80 hours.

When the temperature T2 for the higher temperature annealing is 1100 to 1300° C. and when the holding time t2 in the temperature T2 is 20 to 80 hours, the spinel is sufficiently grown near the interface with the base steel sheet 10 in the glass film 11, and thus the spinel is localized near the interface. Thus, the F1 satisfies the expression (1) and the F2 satisfies the expression (2).

Herein, in the higher temperature annealing stage (S62), the steel sheet may be held for the holding time t2 at the temperature T2 which is constant, or may be held for the holding time t2 while annealing it in the temperature range of 1100 to 1300° C. In so far as the holding time t2 in the temperature range of 1100 to 1300° C. is 20 to 80 hours, the temperature during the holding time t2 may be constant, be increased, or be decreased.

It is preferable that a purification annealing stage is conducted after conducting the higher temperature annealing stage (S62) and before the insulation coating forming process (S7). By conducting the purification annealing stage, the magnetic characteristics are further improved. In the purification annealing stage, under a hydrogen atmosphere, the annealing temperature may be 1000 to 1300° C., and the holding time is 10 hours or more. By conducting the purification annealing stage, each element of the chemical composition of the base steel sheet 10 is removed from the steel composition to a certain extent. In particular, residual elements such as S, Al, and N which affect the iron loss are considerably removed.

(Insulation Coating Forming Process (S7))

In the method for producing the grain oriented electrical steel sheet 1 according to the embodiment, the insulation coating forming process (S7) is conducted after the final annealing process (S6). In the insulation coating forming process (S7), the insulation coating solution which mainly includes colloidal silica and phosphate is applied to the surface (glass film 11) of the grain oriented electrical steel sheet 1 after cooling in the final annealing process (S6), and is baked. Thereby, the tension-insulation coating 12 is formed on the glass film.

The tension-insulation coating 12 formed in the surface of the steel sheet is not particularly limited in so far as the coating is for the tension-insulation coating of the grain oriented electrical steel sheet 1. Known tension-insulation coating may be used. For instance, the tension-insulation coating may be the composite insulation coating which mainly includes the inorganics and further includes the organics. Herein, for instance, the composite insulation coating may be an insulation coating which mainly includes at least one of inorganics such as metal chromate, metal phosphate, colloidal silica, Zr compound, and Ti compound and includes fine organic resin particles which are dispersed. In particular, the tension-insulation coating which uses metal phosphate, Zr coupling agent, Ti coupling agent, carbonate, or ammonium salt thereof. Moreover, flattening annealing to correct the shape thereof may be conducted after the insulation coating forming process (S7). By conducting the flattening annealing for the steel sheet, the iron loss may be further improved.

In the grain oriented electrical steel sheet 1 which is produced by the above processes, the F1 satisfies the expression (1), the F2 satisfies the expression (2), and the spinel is localized near the interface with the base steel sheet 10 in the glass film 11. As a result, the adhesion of the glass film 11 to the base steel sheet 10 is improved.

In particular, in order to produce the grain oriented electrical steel sheet 1 according to the embodiment, it is important that the above producing method satisfies the following. The Al content of slab is 0.01 mass % or more in the hot rolling process (S1), the oxidation degree ($PH_2O/PH_2$) is 0.1 or less in the heating stage (S41) of the decarburization annealing process (S4), and the annealing conditions are controlled in the lower temperature annealing stage (S61) and the higher temperature annealing stage (S62) of the final annealing process (S6).

(Other Producing Processes)

In the grain oriented electrical steel sheet 1 according to the embodiment, a nitriding process may be conducted after the decarburization annealing process (S4) and before the annealing separator applying process (S5). In the nitriding process, the steel sheet after the decarburization annealing process (S4) is subjected to the nitriding treatment in order to obtain the nitrided steel sheet. The nitriding treatment may be conducted under known conditions. For instance, the preferable conditions for nitriding treatment are as follows.

Nitriding Temperature: 700 to 850° C.

Atmosphere in furnace for nitriding treatment (nitridation atmosphere): atmosphere including gas with nitriding ability such as hydrogen, nitrogen, and ammonia.

When the nitriding temperature is 700° C. or more, or when the nitriding temperature is 850° C. or less, nitrogen tends to penetrate into the steel sheet during the nitriding treatment. In the case, the amount of nitrogen in the steel sheet becomes sufficient in the nitriding process. Thus, the fine AlN is sufficiently obtained just before the secondary recrystallization. As a result, the secondary recrystallization preferably occurs during the final annealing process (S6). The holding time in the nitriding temperature during the nitriding process is not particularly limited, but may be 10 to 60 seconds.

(Magnetic Domain Refining Process)

In the grain oriented electrical steel sheet 1 according to the embodiment, as necessary, a magnetic domain refining process may be conducted after the final annealing process (S6) or the insulation coating forming process (S7). In the magnetic domain refining process, in order to refine the magnetic domain, laser is irradiated or grooves are formed on the surface of the grain oriented electrical steel sheet 1. In the case, it is possible to produce the grain oriented electrical steel sheet 1 which is further excellent in the magnetic characteristics.

Examples

Hereinafter, the effects of an aspect of the present invention are described in detail with reference to the following examples. However, the condition in the examples is an example condition employed to confirm the operability and the effects of the present invention, so that the present invention is not limited to the example condition. The present invention can employ various types of conditions as long as the conditions do not depart from the scope of the present invention and can achieve the object of the present invention.

(Production of Each Test Number of Grain Oriented Electrical Steel Sheet) The slab was produced, the slab basically including: as a chemical composition, by mass %, 0.03 to 0.10% of C; 3.0 to 3.5% of Si; 0.2 to 0.3% of sol Al; 0.02 to 0.90% of Mn; 0.005 to 0.03% of N; 0.005 to 0.03 of S; 0.005 to 0.03% of P; and a balance consisting of Fe and impurities.

The slab was subjected to the hot rolling process. Specifically, the slab was heated to 1350° C., the hot rolling was conducted for the slab, and thereby, the hot rolled steel sheet whose thickness was 2.3 mm was produced. The hot rolled steel sheet after the hot rolling process was subjected to the hot rolled steel sheet annealing process under conditions such that the annealing temperature was 900 to 1200° C. and the holding time was 10 to 300 seconds. Thereafter, the cold rolling process was conducted, and thereby, the cold rolled steel sheet (base steel sheet) whose thickness was 0.19 to 0.23 mm was produced.

The cold rolled steel sheet was subjected to the decarburization annealing process. In the decarburization annealing process, the decarburization annealing temperature Ta was 800 to 950° C., and the holding time in the decarburization annealing temperature Ta was 100 seconds. After the decarburization annealing process, the annealing separator which mainly included the magnesium oxide (MgO) and which included Ti compound as necessary was applied to the surface of the steel sheet, and then the final annealing process was conducted.

The insulation coating solution which mainly included colloidal silica and phosphate was applied to the surface (glass film) of the grain oriented electrical steel sheet after cooling in the final annealing process, and was baked. By the above processes, each test number of grain oriented electrical steel sheet was produced.

The production conditions and the production results are shown in Table 1 to Table 6. In Tables, "-" with respect to the chemical composition indicates that the control and the production conscious of content were not conducted, and thus the content was not measured. Moreover, "-" with respect to production conditions and the evaluation results indicates that the control or the evaluation was not conducted.

As shown in Table 4 to Table 6, the test numbers of 1 to 56, 58, 59 and 63 to 66 were subjected to both the lower temperature annealing stage and the higher temperature annealing stage in the final annealing process. On the other hand, the test numbers of 57 and 60 to 62 were not subjected to the lower temperature annealing stage although the higher temperature annealing stage was conducted.

Moreover, as shown in Table 4 to Table 6, in the test numbers of 1 to 59 and 61 to 66, the cold rolled steel sheet was heated under control in the heating stage of the decarburization annealing process. On the other hand, in the test number of 60, the heating stage (S41) of the decarburization annealing process was not conducted (heating conditions of the cold rolled steel sheet were not controlled). Specifically, in the test number, the cold rolled steel sheet was put in the heat treatment furnace for the decarburizing stage (S42) and heated to the decarburization annealing temperature Ta.

Moreover, although not shown in the tables, in the test numbers of 1 to 62, 65, and 66, the Al content of slab was 0.01 mass % or more. On the other hand, in the test numbers of 63 and 64, the Al content of slab was less than 0.01 mass %.

The grain oriented electrical steel sheet which was produced by the above producing method was evaluated as follows.

(Analysis of Chemical Composition of Base Steel Sheet with Glass Film after Removing Tension-Insulation Coating from Grain Oriented Electrical Steel Sheet)

For each test number of grain oriented electrical steel sheet, the chemical composition of base steel sheet with glass film after removing tension-insulation coating (average chemical composition of the base steel sheet and the glass film) was analyzed by the following method.

Firstly, the tension-insulation coating was removed from the grain oriented electrical steel sheet by the method explained above. Specifically, the grain oriented electrical steel sheet was immersed in sodium hydroxide aqueous solution which included 30 to 50 mass % of NaOH and 50 to 70 mass % of $H_2O$ at 80 to 90° C. for 7 to 10 minutes. The steel sheet after immersing (the base steel sheet with the glass film after removing the tension-insulation coating) was water-washed. The steel sheet after water-washing was dried by a warm air blower for approximately less than 1 minute. By the above treatment, the tension-insulation coating was removed, and the base steel sheet with the glass film was obtained.

The known analysis method for composition was conducted for the base steel sheet with the glass film after removing the tension-insulation coating. Specifically, the base steel sheet with the glass film was chipped using a drill, and the machined chips were taken. The above machined chips were dissolved in acid, and the solution was prepared. Using the solution, the elemental analysis of the chemical composition was conducted by ICP-AES.

Si in the chemical composition of the base steel sheet with the glass film was analyzed by the method (silicon quantification method) specified in JIS G1212 (1997). Specifically, when the above machined chips were dissolved in the acid, silicon oxide precipitated as a precipitate. The precipitate (silicon oxide) was filtered out with a filter paper, and the mass was measured to determine the Si content.

The C content and the S content were analyzed by known high frequency combustion method (infrared absorption method after combustion). Specifically, the above solution was combusted by high frequency induction heating in an oxygen stream, and the generated carbon dioxide and sulfur dioxide were detected to determine the C content and the S content.

The N content was analyzed by known thermal conductometric method after fusion in a current of inert gas. The O content was analyzed by known non-dispersive infrared absorption method after fusion in a current of inert gas.

The chemical composition of the base steel sheet with the glass film (average chemical composition of the base steel sheet and the glass film) which was measured by the above analysis methods is shown in Table 1 to Table 3.

(Measurement of F1 Value)

From the center region of each test number of grain oriented electrical steel sheet in the transverse direction TD, a sample whose size was 30 mm in the rolling direction RD, 40 mm in the transverse direction TD, and thickness of the grain oriented electrical steel sheet was taken. The tension-insulation coating was removed from the above sample. Specifically, the grain oriented electrical steel sheet was immersed in sodium hydroxide aqueous solution which included 30 to 50 mass % of NaOH and 50 to 70 mass % of $H_2O$ at 80 to 90° C. for 7 to 10 minutes. The steel sheet after immersing was water-washed. The steel sheet after water-washing was dried by a warm air blower for approximately less than 1 minute. By the above treatment, the sample with the base steel sheet and the glass film and without the tension-insulation coating was obtained.

The glow discharge emission spectroscopy was conducted from the surface of the glass film of the sample toward the depth direction, and the GDS spectrums of Al, Si, and Fe were measured. Specifically, using high frequency glow emission spectroscope (GD-ODS, GDA750 of Rigaku), the GDS spectrum of Al, the GDS spectrum of Si, and the GDS spectrum of Fe in the depth direction on the glass film were measured under conditions such that electric power of 30 W was applied to the sample as a cathode in an argon atmosphere (Ar pressure: 3 hPa). Herein, the measurement area was 4 mmϕ, the measurement time was 100 seconds, and the measurement interval was 0.02 seconds.

The obtained GDS spectrum was smoothed by a simple moving average method.

From the obtained GDS spectrum of Al, the time $T^{Al}_p$ and $F(T^{Al}_p)$ were measured. In the same way, from the obtained GDS spectrum of Si, the time $T^{Si}_p$ was measured, and from the GDS spectrum of Al, $F(T^{Si}_p)$ which was the Al emission intensity at the time $T^{Si}_p$ was measured. The analysis starting time was Ts. Using the time Ts, the time $T^{Al}_p$, the $F(T^{Al}_p)$, the time $T^{Si}_p$, and the $F(T^{Si}_p)$, the F1 and the F2 were obtained. The obtained F1 and F2 are shown in Table 4 to Table 6.

Although not shown in the table, from the obtained GDS spectrum of Fe, the time $T^{Fe}_{60}$ and the time $T^{Fe}_{90}$ were measured.

(Measurement of Magnetic Flux Density B8 and Iron Loss $W_{17/50}$)

Near the center region of each test number of grain oriented electrical steel sheet in the transverse direction, a sample whose size was 60 mm in width and 300 mm in length was taken. The length of sample was parallel to the rolling direction. Using the taken sample, the magnetic flux density B8 was measured on the basis of the single sheet tester (SST) method regulated by JIS C 2556 (2011). Specifically, the magnetic flux density (T) was measured under the condition such that the sample was excited at 800 A/m. The measurement results are shown in Table 4 to Table 6. When the magnetic flux density B8 was 1.90 T or more, it was judged to as acceptable.

Moreover, using the sample, the iron loss $W_{17/50}$ (W/kg) was measured under the conditions of 50 Hz of AC frequency and 1.7 T of maximum magnetic flux density on the basis of JIS C 2556 (2011). The measurement results are shown in Table 4 to Table 6. When the iron loss $W_{17/50}$ was less than 0.85 W/kg, it was judged to as acceptable.

(Evaluation of Adhesion of Glass Film)

From the center region of each test number of grain oriented electrical steel sheet in the transverse direction, a sample whose size was 80 mm in the rolling direction and 30 mm in the transverse direction was taken. The taken sample was rolled around cylinder with 20 mm of diameter and was bent 180°. Thereafter, the rolled sample was returned to the original flat state. After being returned to the original flat state, the total area of the glass film which was not delaminated was measured. Using the measured total area of the glass film, the remained fraction (area %) of the glass film was obtained by the following expression.

Remained fraction (area %) of glass film=Total area of glass film which was remained without delamination/Total area of sample×100

Herein, the total area of sample was 80 mm×30 mm.

From the remained area fraction of the glass film, the adhesion of the glass film was evaluated as follows.

Very Good: Remained area fraction was 90% or more.

Good: Remained area fraction was 85% or more and less than 90%.

Fair: Remained area fraction was 80% or more and less than 85%.

No Good: Remained area fraction was less than 80%.

The evaluation results are shown in Table 4 to Table 6. When the remained area fraction of the glass film was Very Good, Good, and Fair, it was judged to as acceptable.

Herein, in the test numbers where the magnetic flux density B8 was less than 1.90 T or the iron loss $W_{17/50}$ was 0.85 W/kg or more, the magnetic characteristics were judged to as unacceptable, and the evaluation of the adhesion of glass film was not conducted.

(Evaluation Results)

As shown in Table 1 to Table 6, in the test numbers 1 to 50, the average chemical composition was appropriate and the production conditions were also appropriate. As a result, the magnetic characteristics and the adhesion of glass film were excellent. Moreover, although not shown in the Tables, in the test numbers 1 to 50, the GDS spectrum satisfied $T^{Fe}_{60} \leq T^{Al}_p \leq T^{Fe}_{90}$ ($T^{Si}_p \leq T^{Al}_p \leq T^{Fe}_{90}$ was satisfied).

Among the test numbers 1 to 50, the F1 of the test numbers 18 to 25 and 39 to 50 was lower than that of the test numbers 1 to 17 and 26 to 38 and was within 0.05 to 0.30. As a result, the evaluation of the adhesion of glass film in the test numbers 18 to 25 and 39 to 50 was Good or Very Good, and was better than the evaluation (Fair) in the test numbers 1 to 17 and 26 to 38.

Among the test numbers 18 to 25 and 39 to 50, the F1 of the test numbers 22 to 25 and 44 to 50 was within 0.05 to 0.12, and the F1 of the test numbers 18 to 21 and 39 to 43 was within 0.13 to 0.30. As a result, the evaluation of the adhesion of glass film in the test numbers 22 to 25 and 44 to 50 was Very Good, and was better than the evaluation (Good) in the test numbers 18 to 21 and 39 to 43.

On the other hand, in the test numbers 51 to 66, at least one of the average chemical composition and the production conditions was not preferable. As a result, the magnetic characteristics and/or the adhesion of glass film were not satisfied.

In the test number 51, the holding time t1 in the temperature T1 (T1=910 to 1000° C.) for the lower temperature annealing was excessively short in the lower temperature annealing stage of the final annealing process. Thus, although the F1 satisfied the expression (1), the F2 did not satisfy the upper limit of the expression (2). As a result, the iron loss $W_{17/50}$ was 0.85 W/kg or more, and thus, the magnetic characteristics were not satisfied.

In the test number 52, the holding time t1 in the temperature T1 (T1=910 to 1000° C.) for the lower temperature annealing was excessively long in the lower temperature annealing stage of the final annealing process. Thus, although the F2 satisfied the expression (2), the F1 did not satisfy the upper limit of the expression (1). As a result, the adhesion of glass film was No Good, and the adhesion of the glass film to the base steel sheet was insufficient.

In the test number 53, the temperature T2 for the higher temperature annealing was excessively low in the higher temperature annealing stage of the final annealing process. Thus, although the F2 satisfied the expression (2), the F1 did not satisfy the upper limit of the expression (1). As a result, the adhesion of glass film was No Good, and the adhesion of the glass film to the base steel sheet was insufficient.

In the test number 54, the temperature T2 for the higher temperature annealing was excessively high in the higher temperature annealing stage of the final annealing process. Thus, the F1 did not satisfy the lower limit of the expression (1). As a result, the iron loss $W_{17/50}$ was 0.85 W/kg or more, and thus, the magnetic characteristics were not satisfied.

In the test number 55, the holding time t2 in the temperature T2 (T2=1100 to 1300° C.) for the higher temperature annealing was excessively short. Thus, the F1 did not satisfy the upper limit of the expression (1). As a result, the adhesion of glass film was No Good, and the adhesion of the glass film to the base steel sheet was insufficient.

In the test number 56, the holding time t2 in the temperature T2 (T2=1100 to 1300° C.) for the higher temperature annealing was excessively long. Thus, the F1 did not satisfy the lower limit of the expression (1). As a result, the iron loss $W_{17/50}$ was 0.85 W/kg or more, and thus, the magnetic characteristics were not satisfied.

In the test number 57, the lower temperature annealing stage was not conducted. Thus, although the F1 satisfied the expression (1), the F2 did not satisfy the upper limit of the expression (2). As a result, the iron loss $W_{17/50}$ was 0.85 W/kg or more, and thus, the magnetic characteristics were not satisfied.

In the test number 58, the temperature T1 for the lower temperature annealing was excessively low in the lower temperature annealing stage. Thus, the F1 did not satisfy the upper limit of the expression (1), and the F2 did not satisfy the lower limit of the expression (2). As a result, the magnetic flux density B8 was less than 1.90 T, the iron loss $W_{17/50}$ was 0.85 W/kg or more, and thus, the magnetic characteristics were not satisfied.

In the test number 59, the temperature T1 for the lower temperature annealing was excessively high in the lower temperature annealing stage. Thus, although the F1 satisfied the expression (1), the F2 did not satisfy the upper limit of the expression (2). As a result, the iron loss $W_{17/50}$ was 0.85 W/kg or more, and thus, the magnetic characteristics were not satisfied.

In the test number 60, the heating stage of the decarburization annealing process was not conducted (the heating conditions of the cold rolled steel sheet were not controlled). As a result, the iron loss $W_{17/50}$ was 0.85 W/kg or more, and thus, the magnetic characteristics were not satisfied.

In the test number 61, the oxidation degree ($PH_2O/PH_2$) is more than 0.1 in the heating stage of the decarburization annealing process. As a result, the magnetic flux density B8 was less than 1.90 T, the iron loss $W_{17/50}$ was 0.85 W/kg or more, and thus, the magnetic characteristics were not satisfied.

In the test number 62, the oxidation degree ($PH_2O/PH_2$) is more than 0.1 in the heating stage of the decarburization annealing process. As a result, the magnetic flux density B8 was less than 1.90 T, the iron loss $W_{17/50}$ was 0.85 W/kg or more, and thus, the magnetic characteristics were not satisfied.

In the test number 63, the oxidation degree ($PH_2O/PH_2$) is more than 0.1 in the heating stage of the decarburization annealing process, the temperature T1 for the lower temperature annealing was excessively low in the lower temperature annealing stage, and the holding time t2 was excessively short in the higher temperature annealing stage. Moreover, since the Al content of slab was less than 0.01 mass %, the insol Al content was less than 0.005 mass % as the average chemical composition of the base steel sheet and the glass film in the grain oriented electrical steel sheet. As a result, the magnetic flux density B8 was less than 1.90 T, the iron loss $W_{17/50}$ was 0.85 W/kg or more, and thus, the magnetic characteristics were not satisfied.

In the test number 64, the oxidation degree ($PH_2O/PH_2$) is more than 0.1 in the heating stage of the decarburization annealing process, the temperature T1 for the lower temperature annealing was excessively low in the lower temperature annealing stage, and the holding time t2 was excessively short in the higher temperature annealing stage. Moreover, since the Al content of slab was less than 0.01 mass %, the insol Al content was less than 0.005 mass % as the average chemical composition of the base steel sheet and the glass film in the grain oriented electrical steel sheet. As a result, the magnetic flux density B8 was less than 1.90 T, the iron loss $W_{17/50}$ was 0.85 W/kg or more, and thus, the magnetic characteristics were not satisfied.

In the test number 65, the oxidation degree ($PH_2O/PH_2$) is more than 0.1 in the heating stage of the decarburization annealing process. As a result, the iron loss $W_{17/50}$ was 0.85 W/kg or more, and thus, the magnetic characteristics were not satisfied.

In the test number 66, the temperature T1 for the lower temperature annealing was excessively low in the lower temperature annealing stage. As a result, the magnetic flux density B8 was less than 1.90 T, the iron loss $W_{17/50}$ was 0.85 W/kg or more, and thus, the magnetic characteristics were not satisfied.

TABLE 1

PRODUCTION RESULTS
AVERAGE CHEMICAL COMPOSITION (IN UNITS OF MASS %, BALANCE CONSISTING OF Fe AND IMPURITIES)

| TEST NUMBER | C | Si | Mn | N | sol. Al | insol. Al | Mg | O | Ti | S | P | Sn | Cr | Cu | Bi | Se | Sb |
|---|---|---|---|---|---|---|---|---|---|---|---|---|---|---|---|---|---|
| 1 | 0.008 | 3.3 | 0.02 | 0.008 | 0.002 | 0.012 | 0.07 | 0.09 | — | 0.007 | 0.013 | — | — | — | — | — | — |
| 2 | 0.003 | 2.9 | 0.02 | 0.007 | 0.005 | 0.012 | 0.07 | 0.09 | 0.016 | 0.007 | 0.012 | — | — | — | — | — | — |
| 3 | 0.002 | 3.9 | 0.02 | 0.007 | 0.003 | 0.011 | 0.10 | 0.16 | 0.017 | 0.007 | 0.010 | — | — | — | — | — | — |
| 4 | 0.003 | 3.3 | 0.80 | 0.007 | 0.010 | 0.013 | 0.11 | 0.18 | 0.018 | 0.008 | 0.015 | — | — | — | — | — | — |
| 5 | 0.002 | 3.3 | 0.80 | 0.008 | 0.006 | 0.006 | 0.11 | 0.16 | 0.018 | 0.008 | 0.013 | — | — | — | — | — | — |
| 6 | 0.003 | 3.2 | 0.80 | 0.008 | 0.003 | 0.028 | 0.10 | 0.17 | 0.015 | 0.007 | 0.016 | — | — | — | — | — | — |
| 7 | 0.001 | 3.2 | 0.75 | 0.009 | 0.006 | 0.014 | 0.12 | 0.18 | 0.016 | 0.007 | 0.018 | — | — | — | — | — | — |
| 8 | 0.003 | 3.2 | 0.02 | 0.007 | 0.004 | 0.011 | 0.11 | 0.16 | 0.015 | 0.007 | 0.019 | — | — | — | — | — | — |
| 9 | 0.002 | 3.2 | 0.90 | 0.007 | 0.006 | 0.022 | 0.10 | 0.18 | 0.017 | 0.008 | 0.017 | — | — | — | — | — | — |
| 10 | 0.002 | 3.2 | 0.60 | 0.007 | 0.007 | 0.023 | 0.12 | 0.18 | 0.017 | 0.009 | 0.016 | — | — | — | — | — | — |
| 11 | 0.003 | 3.3 | 0.04 | 0.007 | 0.005 | 0.022 | 0.12 | 0.16 | 0.018 | 0.007 | 0.014 | — | — | — | — | — | — |
| 12 | 0.001 | 3.3 | 0.40 | 0.007 | 0.005 | 0.022 | 0.11 | 0.16 | 0.017 | 0.007 | 0.017 | — | — | — | — | — | — |
| 13 | 0.001 | 3.3 | 0.08 | 0.005 | 0.006 | 0.019 | 0.11 | 0.16 | 0.016 | 0.004 | 0.005 | — | — | — | — | — | — |
| 14 | 0.002 | 3.3 | 0.05 | 0.003 | 0.005 | 0.019 | 0.10 | 0.17 | 0.015 | 0.004 | 0.005 | — | 0.40 | — | — | — | — |
| 15 | 0.001 | 3.4 | 0.05 | 0.006 | 0.002 | 0.015 | 0.11 | 0.16 | 0.018 | 0.006 | 0.003 | 0.45 | — | — | — | — | — |
| 16 | 0.003 | 3.3 | 0.15 | 0.003 | 0.003 | 0.016 | 0.12 | 0.18 | 0.016 | 0.005 | 0.004 | — | — | 0.02 | — | — | — |
| 17 | 0.003 | 3.2 | 0.15 | 0.006 | 0.002 | 0.015 | 0.11 | 0.18 | 0.016 | 0.006 | 0.007 | — | — | — | — | — | — |
| 18 | 0.002 | 3.4 | 0.08 | 0.005 | 0.001 | 0.018 | 0.11 | 0.16 | 0.003 | 0.006 | 0.006 | 0.30 | 0.15 | — | — | — | — |
| 19 | 0.002 | 3.5 | 0.05 | 0.003 | 0.003 | 0.015 | 0.12 | 0.17 | 0.003 | 0.004 | 0.008 | 0.10 | 0.05 | 0.07 | 0.0003 | — | — |
| 20 | 0.001 | 3.5 | 0.08 | 0.004 | 0.004 | 0.015 | 0.11 | 0.17 | 0.004 | 0.004 | 0.005 | 0.05 | 0.10 | — | — | — | — |
| 21 | 0.002 | 3.5 | 0.20 | 0.004 | 0.003 | 0.017 | 0.10 | 0.18 | 0.004 | 0.004 | 0.006 | 0.02 | — | 0.05 | 0.0080 | — | — |
| 22 | 0.001 | 3.3 | 0.08 | 0.006 | 0.002 | 0.018 | 0.11 | 0.17 | 0.007 | 0.003 | 0.007 | 0.05 | 0.02 | 0.10 | — | — | — |

TABLE 2

PRODUCTION RESULTS
AVERAGE CHEMICAL COMPOSITION (IN UNITS OF MASS %, BALANCE CONSISTING OF Fe AND IMPURITIES)

| TEST NUMBER | C | Si | Mn | N | sol. Al | insol. Al | Mg | O | Ti | S | P | Sn | Cr | Cu | Bi | Se | Sb |
|---|---|---|---|---|---|---|---|---|---|---|---|---|---|---|---|---|---|
| 23 | 0.001 | 3.5 | 0.20 | 0.005 | 0.005 | 0.017 | 0.10 | 0.17 | 0.006 | 0.004 | 0.005 | 0.02 | 0.02 | 0.02 | — | 0.005 | 0.05 |
| 24 | 0.002 | 3.5 | 0.30 | 0.004 | 0.003 | 0.017 | 0.11 | 0.16 | 0.007 | 0.004 | 0.008 | 0.02 | 0.01 | 0.50 | — | 0.005 | 0.05 |
| 25 | 0.001 | 3.5 | 0.30 | 0.005 | 0.005 | 0.017 | 0.10 | 0.19 | 0.005 | 0.004 | 0.007 | 0.02 | 0.01 | 0.10 | 0.0012 | 0.005 | 0.05 |
| 26 | 0.001 | 3.4 | 0.03 | 0.006 | 0.002 | 0.018 | 0.19 | 0.35 | — | 0.005 | 0.015 | — | — | — | — | — | — |
| 27 | 0.002 | 3.0 | 0.03 | 0.006 | 0.002 | 0.015 | 0.18 | 0.26 | 0.019 | 0.006 | 0.014 | — | — | — | — | — | — |
| 28 | 0.002 | 3.9 | 0.03 | 0.006 | 0.001 | 0.013 | 0.13 | 0.23 | 0.016 | 0.009 | 0.011 | — | — | — | — | — | — |
| 29 | 0.002 | 3.3 | 0.75 | 0.008 | 0.003 | 0.005 | 0.14 | 0.19 | 0.018 | 0.009 | 0.015 | — | — | — | — | — | — |
| 30 | 0.002 | 3.2 | 0.74 | 0.007 | 0.002 | 0.008 | 0.14 | 0.18 | 0.017 | 0.009 | 0.018 | — | — | — | — | — | — |
| 31 | 0.002 | 3.1 | 0.79 | 0.007 | 0.002 | 0.029 | 0.15 | 0.19 | 0.018 | 0.009 | 0.014 | — | — | — | — | — | — |
| 32 | 0.002 | 3.3 | 0.76 | 0.008 | 0.002 | 0.013 | 0.13 | 0.19 | 0.018 | 0.008 | 0.013 | — | — | — | — | — | — |
| 33 | 0.001 | 3.2 | 0.04 | 0.008 | 0.001 | 0.011 | 0.13 | 0.18 | 0.002 | 0.008 | 0.017 | — | — | — | — | — | — |
| 34 | 0.002 | 3.3 | 0.88 | 0.008 | 0.001 | 0.025 | 0.12 | 0.16 | 0.001 | 0.009 | 0.015 | — | — | — | — | — | — |
| 35 | 0.002 | 3.2 | 0.59 | 0.006 | 0.002 | 0.024 | 0.16 | 0.21 | 0.002 | 0.009 | 0.013 | — | — | — | — | — | — |
| 36 | 0.001 | 3.2 | 0.03 | 0.007 | 0.002 | 0.024 | 0.11 | 0.22 | 0.002 | 0.008 | 0.015 | — | — | — | — | — | — |
| 37 | 0.001 | 3.3 | 0.38 | 0.008 | 0.003 | 0.022 | 0.13 | 0.18 | 0.001 | 0.008 | 0.016 | — | — | — | — | — | — |
| 38 | 0.001 | 3.2 | 0.09 | 0.006 | 0.003 | 0.022 | 0.12 | 0.22 | 0.001 | 0.006 | 0.006 | — | — | — | — | — | — |
| 39 | 0.001 | 3.2 | 0.06 | 0.004 | 0.002 | 0.020 | 0.12 | 0.19 | 0.004 | 0.006 | 0.004 | — | 0.41 | — | — | — | — |
| 40 | 0.001 | 3.4 | 0.06 | 0.005 | 0.002 | 0.016 | 0.12 | 0.18 | 0.004 | 0.007 | 0.004 | 0.43 | — | — | — | — | — |
| 41 | 0.001 | 3.2 | 0.16 | 0.005 | 0.002 | 0.016 | 0.11 | 0.16 | 0.011 | 0.007 | 0.004 | — | — | 0.01 | — | — | — |
| 42 | 0.002 | 3.2 | 0.17 | 0.006 | 0.002 | 0.016 | 0.15 | 0.19 | 0.013 | 0.007 | 0.006 | — | — | — | — | — | — |
| 43 | 0.002 | 3.3 | 0.09 | 0.006 | 0.002 | 0.016 | 0.15 | 0.18 | 0.013 | 0.007 | 0.006 | 0.28 | 0.17 | — | — | — | — |
| 44 | 0.002 | 3.4 | 0.06 | 0.004 | 0.003 | 0.016 | 0.11 | 0.22 | 0.005 | 0.006 | 0.006 | 0.09 | 0.06 | 0.05 | 0.0002 | — | — |

TABLE 3

PRODUCTION RESULTS
AVERAGE CHEMICAL COMPOSITION (IN UNITS OF MASS %, BALANCE CONSISTING OF Fe AND IMPURITIES)

| TEST NUMBER | C | Si | Mn | N | sol. Al | insol. Al | Mg | O | Ti | S | P | Sn | Cr | Cu | Bi | Se | Sb |
|---|---|---|---|---|---|---|---|---|---|---|---|---|---|---|---|---|---|
| 45 | 0.001 | 3.5 | 0.07 | 0.003 | 0.001 | 0.018 | 0.13 | 0.19 | 0.006 | 0.006 | 0.005 | 0.06 | 0.09 | — | — | — | — |
| 46 | 0.001 | 3.4 | 0.22 | 0.003 | 0.002 | 0.018 | 0.10 | 0.18 | 0.006 | 0.007 | 0.006 | 0.03 | — | 0.05 | 0.0050 | — | — |
| 47 | 0.001 | 3.2 | 0.09 | 0.005 | 0.002 | 0.017 | 0.12 | 0.22 | 0.005 | 0.005 | 0.005 | 0.06 | 0.01 | 0.08 | — | — | — |

TABLE 3-continued

PRODUCTION RESULTS
AVERAGE CHEMICAL COMPOSITION (IN UNITS OF MASS %, BALANCE CONSISTING OF Fe AND IMPURITIES)

| TEST NUMBER | C | Si | Mn | N | sol. Al | insol. Al | Mg | O | Ti | S | P | Sn | Cr | Cu | Bi | Se | Sb |
|---|---|---|---|---|---|---|---|---|---|---|---|---|---|---|---|---|---|
| 48 | 0.001 | 3.2 | 0.21 | 0.007 | 0.002 | 0.018 | 0.13 | 0.21 | 0.007 | 0.005 | 0.006 | 0.01 | 0.01 | 0.01 | — | 0.003 | 0.07 |
| 49 | 0.002 | 3.3 | 0.28 | 0.003 | 0.001 | 0.016 | 0.12 | 0.19 | 0.008 | 0.006 | 0.006 | 0.01 | 0.03 | 0.45 | — | 0.003 | 0.07 |
| 50 | 0.001 | 3.4 | 0.28 | 0.003 | 0.002 | 0.018 | 0.13 | 0.20 | 0.004 | 0.008 | 0.008 | 0.01 | 0.02 | 0.08 | 0.0011 | 0.003 | 0.05 |
| 51 | 0.008 | 3.3 | 0.02 | 0.008 | 0.002 | 0.012 | 0.09 | 0.15 | 0.005 | 0.007 | 0.013 | — | — | — | — | — | — |
| 52 | 0.003 | 2.9 | 0.02 | 0.007 | 0.005 | 0.012 | 0.13 | 0.21 | 0.006 | 0.007 | 0.012 | — | — | — | — | — | — |
| 53 | 0.003 | 2.9 | 0.02 | 0.007 | 0.005 | 0.012 | 0.11 | 0.18 | 0.006 | 0.007 | 0.012 | — | — | — | — | — | — |
| 54 | 0.008 | 3.3 | 0.02 | 0.008 | 0.002 | 0.012 | 0.12 | 0.16 | 0.005 | 0.007 | 0.013 | — | — | — | — | — | — |
| 55 | 0.003 | 2.9 | 0.02 | 0.007 | 0.005 | 0.012 | 0.13 | 0.23 | 0.007 | 0.007 | 0.012 | — | — | — | — | — | — |
| 56 | 0.008 | 3.3 | 0.02 | 0.008 | 0.002 | 0.012 | 0.12 | 0.20 | 0.005 | 0.007 | 0.013 | — | — | — | — | — | — |
| 57 | 0.003 | 2.9 | 0.02 | 0.007 | 0.005 | 0.012 | 0.08 | 0.15 | 0.006 | 0.007 | 0.012 | — | — | — | — | — | — |
| 58 | 0.008 | 3.3 | 0.02 | 0.008 | 0.002 | 0.012 | 0.09 | 0.16 | 0.008 | 0.007 | 0.013 | — | — | — | — | — | — |
| 59 | 0.003 | 2.9 | 0.02 | 0.007 | 0.005 | 0.012 | 0.08 | 0.14 | 0.008 | 0.007 | 0.012 | — | — | — | — | — | — |
| 60 | 0.001 | 3.3 | 0.08 | 0.005 | 0.002 | 0.010 | 0.10 | 0.13 | 0.006 | 0.005 | 0.010 | 0.10 | — | 0.08 | — | — | — |
| 61 | 0.001 | 3.3 | 0.08 | 0.005 | 0.002 | 0.009 | 0.10 | 0.14 | 0.005 | 0.005 | 0.010 | 0.10 | — | 0.08 | — | — | — |
| 62 | 0.001 | 3.3 | 0.08 | 0.005 | 0.002 | 0.009 | 0.09 | 0.13 | 0.007 | 0.005 | 0.010 | 0.10 | — | 0.08 | — | — | — |
| 63 | 0.001 | 3.2 | 0.07 | 0.0005 | 0.0001 | 0.004 | 0.11 | 0.01 | 0.009 | 0.0004 | 0.030 | 0.03 | 0.05 | — | — | 0.001 | 0.02 |
| 64 | 0.001 | 3.2 | 0.05 | 0.0004 | 0.0002 | 0.003 | 0.11 | 0.01 | 0.008 | 0.0005 | 0.010 | 0.01 | 0.01 | — | — | 0.002 | 0.01 |
| 65 | 0.008 | 3.3 | 0.02 | 0.008 | 0.002 | 0.012 | 0.08 | 0.15 | 0.007 | 0.007 | 0.013 | — | — | — | — | — | — |
| 66 | 0.008 | 3.3 | 0.02 | 0.008 | 0.002 | 0.012 | 0.08 | 0.12 | 0.008 | 0.007 | 0.013 | — | — | — | — | — | — |

TABLE 4

PRODUCTION CONDITIONS

| TEST NUMBER | THICKNESS AFTER COLD ROLLING mm | HEATING STAGE OF DECARBURIZATION ANNEALING | | | LOWER TEMPERATURE ANNEALING STAGE | | HIGHER TEMPERATURE ANNEALING STAGE | |
|---|---|---|---|---|---|---|---|---|
| | | HEATING RATE °C./sec | REACHING TEMPERATURE °C. | $P_{H_2O}/P_{H_2}$ | TEMPERATURE T1° C. | HOLDING TIME t1 hour | TEMPERATURE T2° C. | HOLDING TIME t2 hour |
| 1 | 0.22 | 600 | 750 | 0.05 | 930 | 60 | 1100 | 20 |
| 2 | 0.22 | 600 | 750 | 0.05 | 930 | 60 | 1100 | 20 |
| 3 | 0.22 | 1000 | 850 | 0.05 | 950 | 60 | 1100 | 20 |
| 4 | 0.22 | 1000 | 850 | 0.05 | 950 | 60 | 1100 | 20 |
| 5 | 0.22 | 1000 | 900 | 0.05 | 950 | 60 | 1100 | 20 |
| 6 | 0.22 | 1300 | 900 | 0.05 | 950 | 80 | 1100 | 30 |
| 7 | 0.22 | 1300 | 820 | 0.05 | 950 | 80 | 1100 | 30 |
| 8 | 0.22 | 500 | 820 | 0.05 | 950 | 80 | 1100 | 30 |
| 9 | 0.22 | 500 | 820 | 0.05 | 970 | 80 | 1250 | 30 |
| 10 | 0.22 | 1500 | 950 | 0.05 | 970 | 80 | 1250 | 30 |
| 11 | 0.22 | 1500 | 950 | 0.05 | 970 | 80 | 1250 | 30 |
| 12 | 0.22 | 1000 | 950 | 0.05 | 970 | 85 | 1250 | 60 |
| 13 | 0.22 | 1800 | 1000 | 0.05 | 970 | 85 | 1250 | 60 |
| 14 | 0.22 | 1800 | 1000 | 0.05 | 970 | 85 | 1250 | 60 |
| 15 | 0.22 | 1000 | 950 | 0.05 | 970 | 85 | 1290 | 60 |
| 16 | 0.22 | 1000 | 930 | 0.05 | 970 | 85 | 1290 | 60 |
| 17 | 0.22 | 400 | 930 | 0.05 | 970 | 85 | 1290 | 60 |
| 18 | 0.22 | 400 | 830 | 0.02 | 990 | 90 | 1290 | 80 |
| 19 | 0.22 | 1000 | 750 | 0.02 | 990 | 90 | 1290 | 80 |
| 20 | 0.22 | 1000 | 780 | 0.02 | 990 | 90 | 1290 | 80 |
| 21 | 0.22 | 200 | 700 | 0.02 | 990 | 100 | 1290 | 80 |
| 22 | 0.22 | 200 | 700 | 0.01 | 990 | 100 | 1290 | 80 |

EVALUATION RESULTS

| TEST NUMBER | PRODUCTION RESULTS | | MAGNETIC CHARACTERISTICS | | COATING ADHESION | NOTE |
|---|---|---|---|---|---|---|
| | F1 | F2 | MAGNETIC FLUX DENSITY B8 T | IRON LOSS $W_{17/50}$ W/kg | | |
| 1 | 0.48 | 2.4 | 1.92 | 0.75 | Fair | INVENTIVE EXAMPLE |
| 2 | 0.47 | 2.3 | 1.94 | 0.78 | Fair | INVENTIVE EXAMPLE |

TABLE 4-continued

| | | | | | | |
|---|---|---|---|---|---|---|
| 3 | 0.47 | 2.1 | 1.91 | 0.73 | Fair | INVENTIVE EXAMPLE |
| 4 | 0.45 | 2.3 | 1.92 | 0.78 | Fair | INVENTIVE EXAMPLE |
| 5 | 0.46 | 4.1 | 1.91 | 0.78 | Fair | INVENTIVE EXAMPLE |
| 6 | 0.35 | 2.1 | 1.92 | 0.77 | Fair | INVENTIVE EXAMPLE |
| 7 | 0.42 | 4.8 | 1.93 | 0.73 | Fair | INVENTIVE EXAMPLE |
| 8 | 0.38 | 2.2 | 1.93 | 0.73 | Fair | INVENTIVE EXAMPLE |
| 9 | 0.39 | 4.5 | 1.94 | 0.72 | Fair | INVENTIVE EXAMPLE |
| 10 | 0.41 | 4.9 | 1.92 | 0.73 | Fair | INVENTIVE EXAMPLE |
| 11 | 0.38 | 2.1 | 1.93 | 0.76 | Fair | INVENTIVE EXAMPLE |
| 12 | 0.48 | 2.2 | 1.95 | 0.71 | Fair | INVENTIVE EXAMPLE |
| 13 | 0.36 | 2.3 | 1.93 | 0.73 | Fair | INVENTIVE EXAMPLE |
| 14 | 0.33 | 2.4 | 1.94 | 0.72 | Fair | INVENTIVE EXAMPLE |
| 15 | 0.38 | 2.3 | 1.92 | 0.78 | Fair | INVENTIVE EXAMPLE |
| 16 | 0.41 | 2.3 | 1.93 | 0.75 | Fair | INVENTIVE EXAMPLE |
| 17 | 0.47 | 2.3 | 1.93 | 0.72 | Fair | INVENTIVE EXAMPLE |
| 18 | 0.29 | 3.4 | 1.93 | 0.72 | Good | INVENTIVE EXAMPLE |
| 19 | 0.28 | 3.3 | 1.95 | 0.70 | Good | INVENTIVE EXAMPLE |
| 20 | 0.28 | 3.4 | 1.92 | 0.78 | Good | INVENTIVE EXAMPLE |
| 21 | 0.15 | 3.5 | 1.92 | 0.79 | Good | INVENTIVE EXAMPLE |
| 22 | 0.08 | 4.2 | 1.91 | 0.81 | VeryGood | INVENTIVE EXAMPLE |

TABLE 5

| | PRODUCTION CONDITIONS | | | | | | |
|---|---|---|---|---|---|---|---|
| | THICKNESS AFTER COLD ROLLING | HEATING STAGE OF DECARBURIZATION ANNEALING | | | LOWER TEMPERATURE ANNEALING STAGE | | HIGHER TEMPERATURE ANNEALING STAGE | |
| TEST NUMBER | mm | HEATING RATE °C./sec | REACHING TEMPERATURE °C. | $P_{H2O}/P_{H2}$ | TEMPERATURE T1° C. | HOLDING TIME t1 hour | TEMPERATURE T2° C. | HOLDING TIME t2 hour |
| 23 | 0.22 | 200 | 700 | 0.01 | 990 | 100 | 1290 | 80 |
| 24 | 0.22 | 500 | 990 | 0.01 | 990 | 100 | 1290 | 80 |
| 25 | 0.22 | 500 | 990 | 0.01 | 990 | 100 | 1290 | 80 |
| 26 | 0.19 | 800 | 850 | 0.08 | 930 | 60 | 1100 | 20 |
| 27 | 0.19 | 800 | 850 | 0.08 | 930 | 60 | 1100 | 20 |
| 28 | 0.19 | 1000 | 850 | 0.08 | 950 | 60 | 1100 | 20 |
| 29 | 0.19 | 1000 | 800 | 0.08 | 950 | 60 | 1100 | 20 |
| 30 | 0.19 | 1500 | 950 | 0.05 | 950 | 60 | 1100 | 20 |
| 31 | 0.19 | 1500 | 950 | 0.05 | 950 | 80 | 1100 | 30 |
| 32 | 0.19 | 1600 | 950 | 0.05 | 950 | 80 | 1100 | 30 |
| 33 | 0.19 | 1600 | 950 | 0.09 | 950 | 80 | 1100 | 30 |
| 34 | 0.19 | 1200 | 820 | 0.09 | 970 | 80 | 1250 | 30 |
| 35 | 0.19 | 1200 | 820 | 0.09 | 970 | 80 | 1250 | 30 |
| 36 | 0.19 | 100 | 780 | 0.09 | 970 | 80 | 1250 | 30 |
| 37 | 0.19 | 100 | 780 | 0.09 | 970 | 85 | 1250 | 60 |
| 38 | 0.19 | 100 | 780 | 0.09 | 970 | 85 | 1250 | 60 |
| 39 | 0.19 | 400 | 820 | 0.05 | 970 | 85 | 1250 | 60 |
| 40 | 0.19 | 400 | 820 | 0.05 | 970 | 85 | 1290 | 60 |
| 41 | 0.19 | 400 | 820 | 0.05 | 970 | 85 | 1290 | 60 |
| 42 | 0.19 | 700 | 820 | 0.05 | 970 | 85 | 1290 | 60 |
| 43 | 0.19 | 700 | 820 | 0.05 | 990 | 90 | 1290 | 80 |
| 44 | 0.19 | 700 | 820 | 0.01 | 990 | 90 | 1290 | 80 |

| | EVALUATION RESULTS | | | | | |
|---|---|---|---|---|---|---|
| | PRODUCTION RESULTS | | MAGNETIC CHARACTERISTICS | | | |
| | | | MAGNETIC FLUX DENSITY B8 | IRON LOSS $W_{17/50}$ | | |
| TEST NUMBER | F1 | F2 | T | W/kg | COATING ADHESION | NOTE |
| 23 | 0.06 | 4.1 | 1.95 | 0.71 | VeryGood | INVENTIVE EXAMPLE |
| 24 | 0.08 | 4.0 | 1.95 | 0.72 | VeryGood | INVENTIVE EXAMPLE |
| 25 | 0.09 | 2.1 | 1.96 | 0.70 | VeryGood | INVENTIVE EXAMPLE |
| 26 | 0.42 | 2.4 | 1.91 | 0.72 | Fair | INVENTIVE EXAMPLE |
| 27 | 0.28 | 2.8 | 1.95 | 0.66 | Fair | INVENTIVE EXAMPLE |
| 28 | 0.28 | 2.7 | 1.94 | 0.67 | Fair | INVENTIVE EXAMPLE |
| 29 | 0.33 | 2.7 | 1.92 | 0.69 | Fair | INVENTIVE EXAMPLE |

TABLE 5-continued

| | | | | | | | |
|---|---|---|---|---|---|---|---|
| 30 | 0.45 | 2.6 | 1.93 | 0.69 | Fair | INVENTIVE EXAMPLE |
| 31 | 0.38 | 2.8 | 1.95 | 0.66 | Fair | INVENTIVE EXAMPLE |
| 32 | 0.47 | 2.9 | 1.92 | 0.71 | Fair | INVENTIVE EXAMPLE |
| 33 | 0.32 | 2.1 | 1.91 | 0.73 | Fair | INVENTIVE EXAMPLE |
| 34 | 0.42 | 2.2 | 1.92 | 0.72 | Fair | INVENTIVE EXAMPLE |
| 35 | 0.40 | 2.3 | 1.93 | 0.71 | Fair | INVENTIVE EXAMPLE |
| 36 | 0.45 | 2.4 | 1.93 | 0.74 | Fair | INVENTIVE EXAMPLE |
| 37 | 0.36 | 2.9 | 1.92 | 0.73 | Fair | INVENTIVE EXAMPLE |
| 38 | 0.32 | 2.7 | 1.91 | 0.74 | Fair | INVENTIVE EXAMPLE |
| 39 | 0.28 | 3.4 | 1.91 | 0.75 | Good | INVENTIVE EXAMPLE |
| 40 | 0.27 | 3.4 | 1.93 | 0.69 | Good | INVENTIVE EXAMPLE |
| 41 | 0.25 | 3.3 | 1.93 | 0.71 | Good | INVENTIVE EXAMPLE |
| 42 | 0.15 | 3.6 | 1.95 | 0.68 | Good | INVENTIVE EXAMPLE |
| 43 | 0.14 | 3.6 | 1.95 | 0.67 | Good | INVENTIVE EXAMPLE |
| 44 | 0.10 | 4.1 | 1.96 | 0.66 | VeryGood | INVENTIVE EXAMPLE |

TABLE 6

| | PRODUCTION CONDITIONS | | | | | | |
|---|---|---|---|---|---|---|---|
| | THICKNESS AFTER COLD ROLLING | HEATING STAGE OF DECARBURIZATION ANNEALING | | | LOWER TEMPERATURE ANNEALING STAGE | | HIGHER TEMPERATURE ANNEALING STAGE | |
| TEST NUMBER | mm | HEATING RATE °C./sec | REACHING TEMPERATURE °C. | $P_{H2O}/P_{H2}$ | TEMPERATURE T1° C. | HOLDING TIME t1 hour | TEMPERATURE T2° C. | HOLDING TIME t2 hour |
| 45 | 0.19 | 1000 | 860 | 0.01 | 990 | 90 | 1290 | 80 |
| 46 | 0.19 | 1000 | 860 | 0.01 | 990 | 100 | 1290 | 80 |
| 47 | 0.19 | 1000 | 860 | 0.01 | 990 | 100 | 1290 | 80 |
| 48 | 0.19 | 1000 | 860 | 0.01 | 990 | 100 | 1290 | 80 |
| 49 | 0.19 | 1000 | 860 | 0.01 | 990 | 100 | 1290 | 80 |
| 50 | 0.19 | 1000 | 860 | 0.01 | 990 | 100 | 1290 | 80 |
| 51 | 0.22 | 1500 | 860 | 0.05 | 950 | 40 | 1200 | 40 |
| 52 | 0.22 | 1500 | 770 | 0.05 | 950 | 150 | 1200 | 40 |
| 53 | 0.22 | 1500 | 770 | 0.05 | 950 | 80 | 1000 | 40 |
| 54 | 0.22 | 1500 | 770 | 0.05 | 950 | 80 | 1320 | 40 |
| 55 | 0.22 | 800 | 800 | 0.08 | 950 | 90 | 1200 | 10 |
| 56 | 0.22 | 800 | 800 | 0.08 | 950 | 90 | 1200 | 90 |
| 57 | 0.22 | 800 | 800 | 0.08 | — | — | 1200 | 40 |
| 58 | 0.22 | 800 | 800 | 0.08 | 870 | 60 | 1200 | 60 |
| 59 | 0.22 | 800 | 800 | 0.08 | 1020 | 60 | 1250 | 60 |
| 60 | 0.22 | — | — | — | — | — | 1200 | 24 |
| 61 | 0.22 | 480 | 850 | 0.2 | — | — | 1200 | 24 |
| 62 | 0.22 | 480 | 850 | 0.3 | — | — | 1200 | 24 |
| 63 | 0.23 | 20 | 840 | 0.3 | 900 | 50 | 1200 | 10 |
| 64 | 0.23 | 150 | 840 | 0.3 | 900 | 50 | 1200 | 10 |
| 65 | 0.22 | 1000 | 820 | 0.2 | 930 | 60 | 1100 | 20 |
| 66 | 0.22 | 1000 | 820 | 0.1 | 900 | 60 | 1200 | 60 |

| | | | EVALUATION RESULTS | | | |
|---|---|---|---|---|---|---|
| | | | MAGNETIC CHARACTERISTICS | | | |
| TEST NUMBER | PRODUCTION RESULTS | | MAGNETIC FLUX DENSITY B8 T | IRON LOSS $W_{17/50}$ W/kg | COATING ADHESION | NOTE |
| | F1 | F2 | | | | |
| 45 | 0.08 | 3.8 | 1.93 | 0.68 | VeryGood | INVENTIVE EXAMPLE |
| 46 | 0.09 | 3.8 | 1.92 | 0.68 | VeryGood | INVENTIVE EXAMPLE |
| 47 | 0.07 | 3.9 | 1.94 | 0.68 | VeryGood | INVENTIVE EXAMPLE |
| 48 | 0.06 | 4.2 | 1.95 | 0.66 | VeryGood | INVENTIVE EXAMPLE |
| 49 | 0.05 | 3.7 | 1.94 | 0.66 | VeryGood | INVENTIVE EXAMPLE |
| 50 | 0.06 | 3.5 | 1.96 | 0.65 | VeryGood | INVENTIVE EXAMPLE |
| 51 | 0.08 | 5.5 | 1.92 | 0.95 | — | COMPARATIVE EXAMPLE |
| 52 | 0.73 | 2.3 | 1.91 | 0.72 | NoGood | COMPARATIVE EXAMPLE |
| 53 | 0.65 | 4.1 | 1.90 | 0.74 | NoGood | COMPARATIVE EXAMPLE |
| 54 | 0.02 | 3.3 | 1.91 | 0.98 | — | COMPARATIVE EXAMPLE |
| 55 | 0.59 | 2.8 | 1.90 | 0.75 | NoGood | COMPARATIVE EXAMPLE |
| 56 | 0.04 | 3.5 | 1.90 | 0.94 | — | COMPARATIVE EXAMPLE |

TABLE 6-continued

| | | | | | | |
|---|---|---|---|---|---|---|
| 57 | 0.15 | 5.6 | 1.91 | 0.86 | — | COMPARATIVE EXAMPLE |
| 58 | 0.55 | 1.3 | 1.65 | 1.25 | — | COMPARATIVE EXAMPLE |
| 59 | 0.12 | 5.5 | 1.92 | 0.89 | — | COMPARATIVE EXAMPLE |
| 60 | 0.65 | 3.2 | 1.91 | 0.87 | — | COMPARATIVE EXAMPLE |
| 61 | 0.62 | 3.3 | 1.89 | 0.87 | — | COMPARATIVE EXAMPLE |
| 62 | 0.63 | 3.3 | 1.87 | 0.88 | — | COMPARATIVE EXAMPLE |
| 63 | 0.95 | 3.0 | 1.88 | 0.89 | — | COMPARATIVE EXAMPLE |
| 64 | 0.93 | 3.5 | 1.87 | 0.91 | — | COMPARATIVE EXAMPLE |
| 65 | 0.55 | 1.5 | 1.90 | 0.95 | — | COMPARATIVE EXAMPLE |
| 66 | 0.53 | 1.5 | 1.68 | 1.21 | — | COMPARATIVE EXAMPLE |

INDUSTRIAL APPLICABILITY

According to the above aspects of the present invention, it is possible to provide the grain oriented electrical steel sheet excellent in the adhesion of the glass film. Accordingly, the present invention has significant industrial applicability.

REFERENCE SIGNS LIST

1 Grain oriented electrical steel sheet
10 Base steel sheet
11 Glass film
12 Tension-insulation coating

What is claimed is:

1. A grain oriented electrical steel sheet comprising:
a base steel sheet;
a glass film which is arranged on the base steel sheet; and
a tension-insulation coating which is arranged on the glass film,
wherein an average chemical composition of the base steel sheet and the glass film includes by mass %:
0.010% or less of C;
2.5 to 4.0% of Si;
0.01 to 1.00% of Mn;
0.010% or less of N;
0.010% or less of sol Al;
0.005 to 0.030% of insol Al;
0.05 to 0.20% of Mg;
0.05 to 0.40% of O;
0 to 0.020% of Ti;
0.010% or less of S;
0.030% or less of P;
0 to 0.50% of Sn;
0 to 0.50% of Cr;
0 to 0.50% of Cu;
0 to 0.0100% of Bi;
0 to 0.020% of Se;
0 to 0.50% of Sb; and
a balance comprising Fe and impurities, and
wherein, when glow emission spectroscopic spectrums of Al and Si are measured by conducting a glow discharge emission spectroscopy from a surface of the glass film toward a depth direction,
when Ts which is an analysis starting time is regarded as the surface of the glass film,
when $T^{Al}_p$ is regarded as a time at which Al shows a maximum emission intensity,
when $F(T^{Al}_p)$ is regarded as an Al emission intensity at the $T^{Al}_p$,
when $T^{Si}_p$ is regarded as a time at which Si shows a maximum emission intensity, and
when $F(T^{Si}_p)$ is regarded as an Al emission intensity at the $T^{Si}_p$,
the Ts, the $T^{Al}_p$, the $F(T^{Al}_p)$, the $T^{Si}_p$, and the $F(T^{Si}_p)$ satisfy
$0.05 \leq F(T^{Si}_p)/F(T^{Al}_p) \leq 0.50$ and
$2.0 \leq (T^{Al}_p - Ts)/(T^{Si}_p - Ts) \leq 5.0$.

2. The grain oriented electrical steel sheet according to claim 1,
wherein a thickness of the base steel sheet is 0.17 mm or more and less than 0.22 mm.

3. The grain oriented electrical steel sheet according to claim 1,
wherein the average chemical composition includes, by mass %, at least one selected from:
0.01 to 0.50% of Cr;
0.01 to 0.50% of Sn;
0.01 to 0.50% of Cu;
0.0010 to 0.0100% of Bi;
0.001 to 0.020% of Se; and
0.01 to 0.50% of Sb.

4. The grain oriented electrical steel sheet according to claim 2,
wherein the average chemical composition includes, by mass %, at least one selected from:
0.01 to 0.50% of Cr;
0.01 to 0.50% of Sn;
0.01 to 0.50% of Cu;
0.0010 to 0.0100% of Bi;
0.001 to 0.020% of Se; and
0.01 to 0.50% of Sb.

5. The grain oriented electrical steel sheet according to claim 1,
wherein, when glow emission spectroscopic spectrums of Al and Fe are measured by conducting a glow discharge emission spectroscopy from a surface of the glass film toward a depth direction,
when $T^{Al}_p$ is regarded as a time at which Al shows a maximum emission intensity,
when $T^{Fe}_{60}$ is regarded as a time at which an Fe emission intensity becomes 60% as compared with a saturation value of Fe emission intensity, and
when $T^{Fe}_{90}$ is regarded as a time at which an Fe emission intensity becomes 90% as compared with the saturation value of Fe emission intensity,
the $T^{Al}_p$, the $T^{Fe}_{60}$, and the $T^{Fe}_{90}$ satisfy
$T^{Fe}_{60} < T^{Al}_p \leq T^{Fe}_{90}$.

6. The grain oriented electrical steel sheet according to claim 2,
wherein, when glow emission spectroscopic spectrums of Al and Fe are measured by conducting a glow discharge emission spectroscopy from a surface of the glass film toward a depth direction,
when $T^{Al}_p$ is regarded as a time at which Al shows a maximum emission intensity,
when $T^{Fe}_{60}$ is regarded as a time at which an Fe emission intensity becomes 60% as compared with a saturation value of Fe emission intensity, and when $T^{Fe}_{90}$ is regarded as a time at which an Fe emission intensity becomes 90% as compared with the saturation value of Fe emission intensity, the $T^{Al}_{p}$, the $T^{Fe}_{60}$, and the $T^{Fe}_{90}$ satisfy $T^{Fe}_{60} \leq T^{Al}_{p} \leq T^{Fe}_{90}$.

7. The grain oriented electrical steel sheet according to claim 3, wherein, when glow emission spectroscopic spectrums of Al and Fe are measured by conducting a glow discharge emission spectroscopy from a surface of the glass film toward a depth direction, when $T^{Al}_{p}$ is regarded as a time at which Al shows a maximum emission intensity, when $T^{Fe}_{60}$ is regarded as a time at which an Fe emission intensity becomes 60% as compared with a saturation value of Fe emission intensity, and when $T^{Fe}_{90}$ is regarded as a time at which an Fe emission intensity becomes 90% as compared with the saturation value of Fe emission intensity, the $T^{Al}_{p}$, the $T^{Fe}_{60}$, and the $T^{Fe}_{90}$ satisfy $T^{Fe}_{60} \leq T^{Al}_{p} \leq T^{Fe}_{90}$.

8. The grain oriented electrical steel sheet according to claim 4, wherein, when glow emission spectroscopic spectrums of Al and Fe are measured by conducting a glow discharge emission spectroscopy from a surface of the glass film toward a depth direction, when $T^{Al}_{p}$ is regarded as a time at which Al shows a maximum emission intensity, when $T^{Fe}_{60}$ is regarded as a time at which an Fe emission intensity becomes 60% as compared with a saturation value of Fe emission intensity, and when $T^{Fe}_{90}$ is regarded as a time at which an Fe emission intensity becomes 90% as compared with the saturation value of Fe emission intensity, the $T^{Al}_{p}$, the $T^{Fe}_{60}$, and the $T^{Fe}_{90}$ satisfy $T^{Fe}_{60} \leq T^{Al}_{p} \leq T Fe_{90}$.

* * * * *